United States Patent
Yamada

(10) Patent No.: US 10,754,807 B2
(45) Date of Patent: Aug. 25, 2020

(54) CIRCUIT DEVICE, ELECTRONIC DEVICE, AND CABLE HARNESS

(71) Applicant: SEIKO EPSON CORPORATION, Tokyo (JP)

(72) Inventor: Toshimichi Yamada, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/367,858

(22) Filed: Mar. 28, 2019

(65) Prior Publication Data

US 2019/0303332 A1 Oct. 3, 2019

(30) Foreign Application Priority Data

Mar. 29, 2018 (JP) ................................ 2018-065200

(51) Int. Cl.
| | |
|---|---|
| *G06F 13/40* | (2006.01) |
| *G06F 13/20* | (2006.01) |
| *G06F 13/42* | (2006.01) |
| *B60R 16/023* | (2006.01) |

(52) U.S. Cl.
CPC .......... *G06F 13/4022* (2013.01); *G06F 13/20* (2013.01); *G06F 13/4282* (2013.01); *B60R 16/023* (2013.01); *G06F 2213/0042* (2013.01)

(58) Field of Classification Search
CPC ..................... G06F 13/4022; G06F 2213/0042
See application file for complete search history.

(56) References Cited

U.S. PATENT DOCUMENTS

| | | | |
|---|---|---|---|
| 2002/0062457 A1 | 5/2002 | Kamihara | |
| 2003/0026152 A1* | 2/2003 | Shinozaki | G11C 7/06 365/207 |
| 2004/0153630 A1* | 8/2004 | Henry | G06F 9/30145 712/209 |
| 2016/0072462 A1* | 3/2016 | Itabashi | H01L 21/2885 330/4.6 |
| 2017/0010997 A1* | 1/2017 | Lin | G06F 1/3278 |

FOREIGN PATENT DOCUMENTS

| | | |
|---|---|---|
| JP | 2002-141911 A | 5/2002 |
| JP | 2006-135397 A | 5/2006 |

OTHER PUBLICATIONS

Universal Serial Bus Specification, Revision 2.0, Apr. 27, 2000 (Year: 2000).*

* cited by examiner

*Primary Examiner* — Farley Abad
(74) *Attorney, Agent, or Firm* — Oliff PLC

(57) ABSTRACT

A circuit device includes first and second physical layer circuits, a bus switch circuit that switches connection between a first bus and a second bus that comply with a USB standard on in a first period and off in a second period, and a processing circuit that performs, in the second period, packet transfer processing on a transfer route that includes the first bus, the first and second physical layer circuits, the second bus. The bus switch circuit includes a first switch circuit, a second switch circuit, and a signal line connected between the first switch circuit and the second switch circuit.

14 Claims, 23 Drawing Sheets

CIRCUIT DEVICE, ELECTRONIC DEVICE, AND CABLE HARNESS

BACKGROUND

This application claims priority to Japanese Patent Application No. 2018-065200, filed Mar. 29, 2018. The disclosure of the prior application is hereby incorporated in its entirety herein.

1. Technical Field

The present invention relates to a circuit device, an electronic device, a cable harness, and the like.

2. Related Art

A circuit device that realizes USB (universal serial bus) data transfer control is known. The techniques disclosed in JP-A-2006-135397 and JP-A-2002-141911 are known examples of such a circuit device. For example, JP-A-2006-135397 discloses technology in which an enable control signal for a current source of an HS (high speed) mode transmission circuit is set to active at a timing before a packet transmission start timing. JP-A-2002-141911 discloses technology in which, in the case where a switch from the HS mode to an FS (full speed) mode is performed, self-running is disabled for a PLL that generates a high-speed clock for the HS mode.

JP-A-2006-135397 and JP-A-2002-141911 are examples of related art.

In USB technology, an HS mode transmission circuit is provided in a physical layer circuit. However, parasitic capacitance and parasitic resistance exist in the signal path of transmission signals in the HS mode transmission circuit, and therefore there is a problem of degradation in the signal characteristics of the transmission signals due to such parasitic capacitance and parasitic resistance. For example, there is a possibility that, in a circuit device provided between the host and the device of a USB, the wiring capacitance of a signal line that bypasses between a first bus on the host side and a second bus on the device side will negatively affect the signal characteristics of the USB.

SUMMARY

One aspect of the present invention pertains to a circuit device that includes a first physical layer circuit to which a first bus that complies with a USB standard is connected, a second physical layer circuit to which a second bus that complies with the USB standard is connected, a bus switch circuit, one end of which is connected to the first bus, another end of which is connected to the second bus, and that switches connection between the first bus and the second bus on in a first period and off in a second period, and a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit, and the bus switch circuit includes a first switch circuit, one end of which is connected to the first bus, and that is switched on in the first period, and is switched off in the second period, a second switch circuit, one end of which is connected to the second bus, and that is switched on in the first period, and is switched off in the second period, and a signal line that is connected to another end of the first switch circuit and another end of the second switch circuit.

Also, in one aspect in the present invention, when a line at a center between a first side and a second side of the circuit device that oppose each other is assumed to be a central line, a region between the central line and the first side is assumed to be a first region, and a region between the central line and the second side is assumed to be a second region, a first HS driver of the first physical layer circuit and the first switch circuit may be arranged in the first region, and a second HS driver of the second physical layer circuit and the second switch circuit may be arranged in the second region.

Also, in one aspect in the present invention, when a direction from the first side toward the second side is assumed to be a first direction, and one of directions orthogonal to the first direction is assumed to be a second direction, the first switch circuit may be arranged on the second direction side of the first HS driver, and the second switch circuit may be arranged on the second direction side of the second HS driver.

Also, in one aspect in the present invention, a first terminal to which a DP signal line of the first bus is connected, a second terminal to which a DM signal line of the first bus is connected, a third terminal to which a DP signal line of the second bus is connected, and a fourth terminal to which a DM signal line of the second bus is connected are included, and when a direction from the first side toward the second side is assumed to be a first direction, and a direction opposite to the first direction is assumed to be a third direction, the first switch circuit may be arranged on the first direction side of the first terminal and the second terminal, and the second switch circuit may be arranged on the third direction side of the third terminal and the fourth terminal.

Also, in one aspect in the present invention, a first terminal to which a DP signal line of the first bus is connected, a second terminal to which a DM signal line of the first bus is connected, a third terminal to which a DP signal line of the second bus is connected, and a fourth terminal to which a DM signal line of the second bus is connected are included, and the first switch circuit may be arranged in a first I/O region in which the first terminal and the second terminal are arranged, and the second switch circuit may be arranged in a second I/O region in which the third terminal and the fourth terminal are arranged.

Also, in one aspect in the present invention, a first I/O cell that has the first terminal and a second I/O cell that has the second terminal may be arranged in the first I/O region, a third I/O cell that has the third terminal and a fourth I/O cell that has the fourth terminal may be arranged in the second I/O region, the first switch circuit may be arranged between the first I/O cell and the second I/O cell, and the second switch circuit may be arranged between the third I/O cell and the fourth I/O cell.

Also, in one aspect in the present invention, a wiring width of the signal line that connects the first switch circuit and the second switch circuit may be larger than a wiring width of a signal line that connects the first bus and the first switch circuit and a wiring width of a signal line that connects the second bus and the second switch circuit.

Also, in one aspect in the present invention, a cross-section area in a transverse cross section of the signal line that connects the first switch circuit and the second switch circuit may be larger than a cross-section area in a transverse cross section of the signal line that connects the first bus and the first switch circuit and a cross-section area in a transverse cross section of the signal line that connects the second bus and the second switch circuit.

Also, in one aspect in the present invention, the signal line that connects the first switch circuit and the second switch circuit may include a first metal wiring layer and a second metal wiring layer that is provided below the first metal wiring layer.

Also, in one aspect in the present invention, a bus monitor circuit that performs a monitor operation of the first bus and the second bus may be included, and the bus switch circuit may switch the connection between the first bus and the second bus on or off based on a monitoring result of the bus monitor circuit.

Also, another aspect of the invention pertains to an electronic device including the circuit device according to any of the above aspects, and a processing device that is connected to the first bus.

Also, another aspect of the invention pertains to a cable harness including the circuit device according to any of the above aspects, and a cable.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following is a detailed description of preferred embodiments of the invention. Note that the embodiments described below are not intended to unduly limit the content of the invention recited in the claims, and all of the configurations described in the embodiments are not necessarily essential as solutions provided by the invention.

1. Signal Characteristics of Transmission Signals

Figure 1:
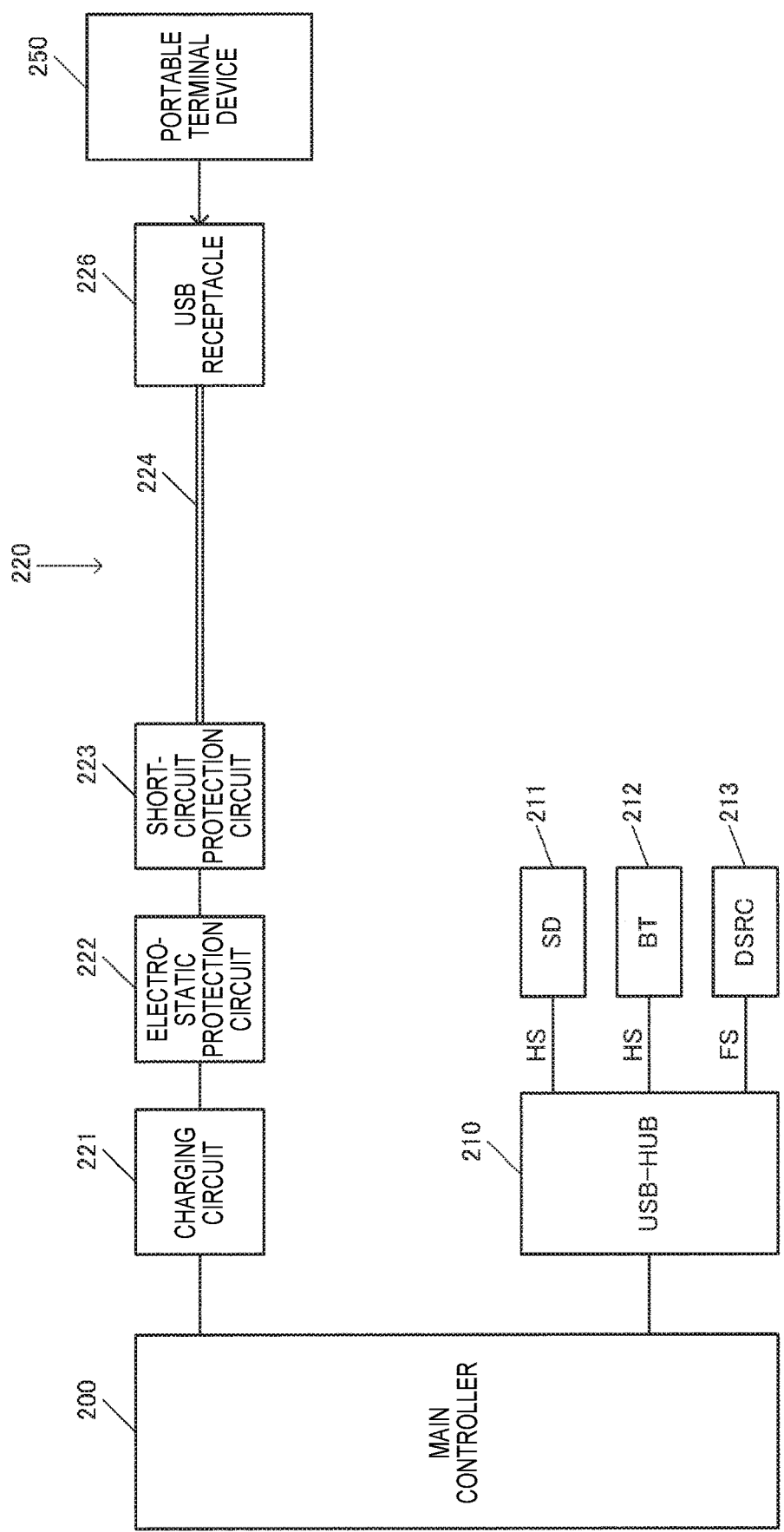
FIG. 1 is an illustrative diagram regarding a problem of degradation in the signal characteristics of a transmission signal.

Degradation in the signal characteristics of transmission signals in USB will be described below with reference to FIG. 1. FIG. 1 shows an example of a vehicle-mounted electronic device system in which a USB-HUB 210 is connected to a main controller 200 that is a host. In one example, an upstream port of the USB-HUB 210 is connected to the main controller 200, and a downstream port is connected to devices such as an SD 211, a BT 212, and a DSRC (dedicated short range communications) 213. The SD 211 is an SD card device, and the BT 212 is a Bluetooth (registered trademark) device. Also, a portable terminal device 250 such as a smartphone is connected to a USB receptacle 226 of a cable harness 220 that has a cable 224. A charging circuit 221, an electrostatic protection circuit 222, a short-circuit protection circuit 223, and the like are provided between the main controller 200 and the USB receptacle 226.

In FIG. 1, the cable 224 is routed so as to avoid the interior or the like of a vehicle, and therefore the cable tends to be very long, and parasitic capacitance and the like is generated. Furthermore, parasitic capacitance and the like is also generated due to circuits such as the charging circuit 221, the electrostatic protection circuit 222, and the short-circuit protection circuit 223. This parasitic capacitance and the like causes degradation in the signal characteristics of HS transmission signals in an USB of the main controller 200. On the other hand, in a USB authentication test, there are demands that the waveform of a transmission signal does not overlap an eye pattern prohibition region. However, if the signal quality of a transmission signal is degraded due to reasons such as an increase in the length of the cable 224 that is routed in a vehicle in FIG. 1, appropriate signal transfer cannot be realized, and problems of not being able to pass an eye pattern near-end authentication test, for example, occur.

2. Configuration Example of Circuit Device

Figure 2:
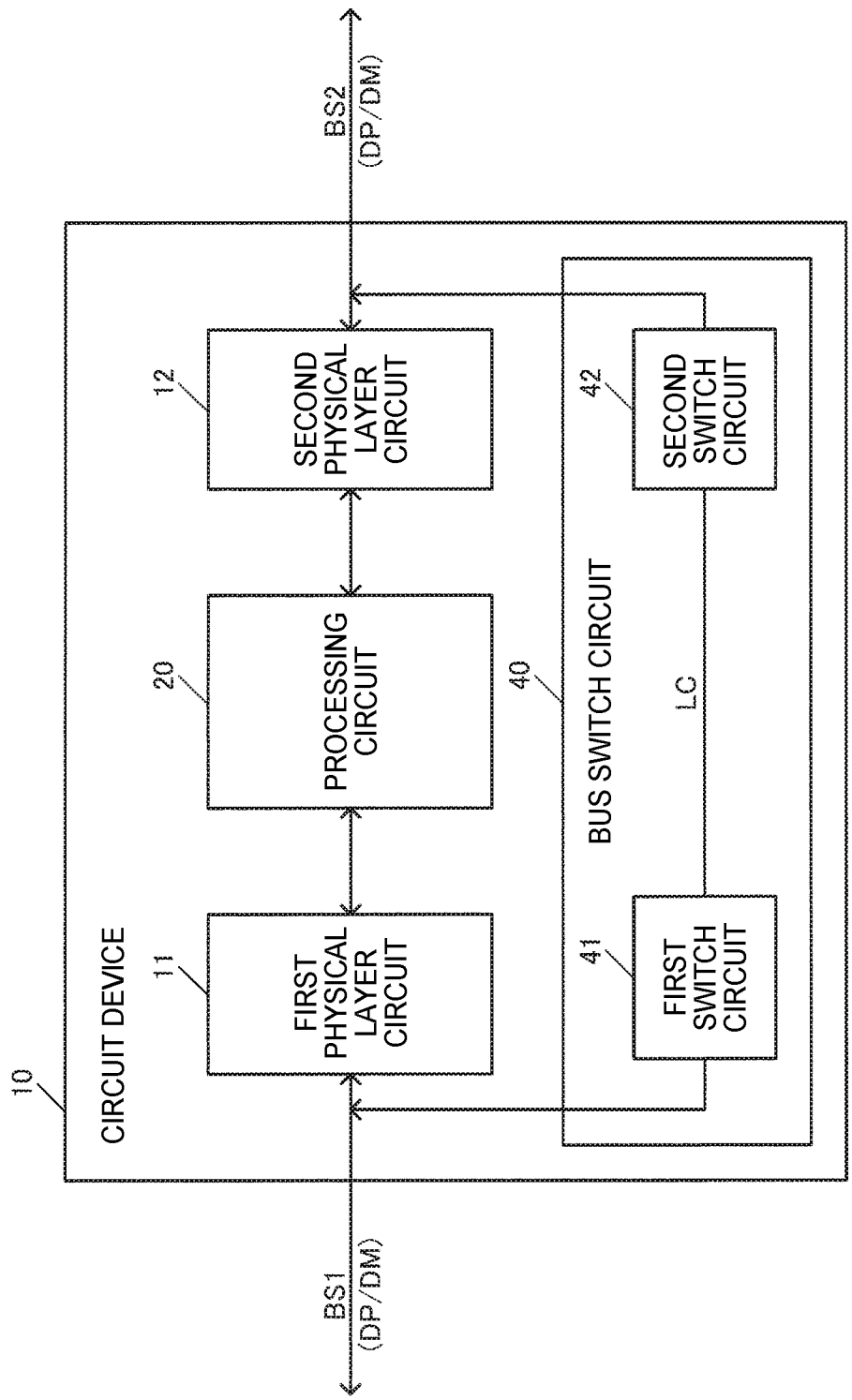
FIG. 2 shows a configuration example of a circuit device according to an embodiment of the invention.

FIG. 2 shows a configuration example of a circuit device 10 of this embodiment. The circuit device 10 includes a first physical layer circuit 11, a second physical layer circuit 12, a processing circuit 20, and a bus switch circuit 40. The bus switch circuit 40 includes a first switch circuit 41, a second switch circuit 42, and a signal line LC. Note that the circuit device 10 is not limited to the configuration in FIG. 2, and various modifications can be carried out, such as omitting a portion of these constituent elements, or adding other constituent elements.

The first physical layer circuit 11 is connected to a USB-standard first bus BS1. The second physical layer circuit 12 is connected to a USB-standard second bus BS2. The first and second physical layer circuits 11 and 12 are each configured by physical layer analog circuits. Examples of the physical layer analog circuits include drivers that are HS and FS transmission circuits, receivers that are HS and FS reception circuits, various detection circuits, and a pull-up resistance circuit. Note that the processing circuit 20 includes circuits that correspond to the link layer, such as a serial-to-parallel conversion circuit that converts serial data received via USB into parallel data, a parallel-to-serial conversion circuit that converts parallel data into serial data, an elastic buffer, and an NRZI circuit. For example, circuits that correspond to the link layer or the like of a USB transceiver macrocell are included in the processing circuit 20, and analog circuits such as a transmission circuit, a reception circuit, and detection circuits are included in the first and second physical layer circuits 11 and 12.

The first bus BS1 is a bus to which a host is connected, for example, and the second bus BS2 is a bus to which a device is connected, for example. It should be noted that this embodiment is not limited to this connection configuration. The first bus BS1 and the second bus BS2 are USB-standard buses that include signal lines for signals DP (DataPlus) and DM (DataMinus) that are first and second signals constituting differential signals. The first bus BS1 and the second bus BS2 can include power supply VBUS and GND signal lines. The USB standard is broadly a given data transfer standard.

One end of the bus switch circuit 40 is connected to the first bus BS1, and the other end is connected to the second bus BS2. The connection between the first bus BS1 and the second bus BS2 can be switched on or off. In other words, the first bus BS1 and the second bus BS2 are electrically connected or electrically disconnected. Switching on or off the connection between the first bus BS1 and the second bus BS2 is switching on or off, for example, a switch element provided between the DP and DM signal lines of the first bus BS1 and the DP and DM signal lines of the second bus BS2. In addition, connection between circuits and connection between a bus or a signal line and a circuit in this embodiment is electrical connection. Electrical connection is connection that allows transmission of electrical signals, and connection that allows transmission of information using electrical signals. Electrical connection may be connection through a signal line, an active element, and the like.

Specifically, as shown in later-described FIG. 5, the bus switch circuit 40 switches on the connection between the first bus BS1 and the second bus BS2 in a first period T1. More specifically, the bus switch circuit 40 has switch elements provided between the first bus BS1 and the second bus BS2, and the switch elements are switched on in the first period T1. Accordingly, the main controller 200 that is connected to the first bus BS1 and a peripheral device 260 that is connected to the second bus BS2 can directly perform USB signal transfer via USB buses. Note that, as examples of the switch elements, a switch element for signals DP and a switch element for signals DM are provided. In addition, the main controller 200 and the peripheral device 260 are broadly a first device and a second device. Also, as shown in later-described FIG. 6, the bus switch circuit 40 switches off the connection between the first bus BS1 and the second bus BS2 in a second period T2. More specifically, in the second period T2, switch elements provided between the first bus BS1 and the second bus BS2 are switched off. In this second period T2, the processing circuit 20 performs transfer processing that is described below.

The processing circuit 20 is a circuit that performs transfer processing and various types of control processing, and can be realized by, for example, a logic circuit obtained by automatic placement and routing, such as a gate array. Note that the processing circuit 20 may be realized by a processor such as a CPU or an MPU. In the second period T2, the processing circuit 20 performs transfer processing in which packets received from the first bus BS1 via the first physical layer circuit 11 are transmitted to the second bus BS2 via the second physical layer circuit 12, and packets received from the second bus BS2 via the second physical layer circuit 12 are transmitted to the first bus BS1 via the first physical layer circuit 11. For example, the transfer processing is performed at least in a portion of the second period T2. For example, packets are transferred from the first bus BS1 to the second bus BS2 or from the second bus BS2 to the first bus BS1 without changing the packet format. At this time, the processing circuit 20 performs predetermined signal processing in this transfer processing. This predetermined signal processing is signal processing for packet transfer, and is for transferring repeat packets corresponding to received packets. For example, the processing circuit 20 performs predetermined packet bit resynchronization processing as the predetermined signal processing. For example, when a packet is received, the bits in the packet are sampled based on a clock signal generated by the circuit device 10. When a packet is transmitted, the bits in the packet are transmitted in synchronization with a clock signal generated by the circuit device 10. When packet transfer is performed on a transfer route TR2 in FIG. 6 that passes through the processing circuit 20, due to the processing circuit 20 performing predetermined signal processing, it is possible to realize high-quality signal transfer in which degraded signal characteristics of USB transmission signals are improved.

Also, in FIG. 2, the bus switch circuit 40 includes the first switch circuit 41, the second switch circuit 42, and the signal line LC. One end of the first switch circuit 41 is connected to the first bus BS1, and the first switch circuit 41 is switched on in the first period T1 and switched off in the second period T2. The first switch circuit 41 is constituted by a first switch element for signals DP and a second switch element for signals DM, for example. One end of the first switch element is connected to the DP signal line of the first bus BS1, and the other end is connected to a DP signal line of the signal line LC. One end of the second switch element is connected to the DM signal line of the first bus BS1, and the other end is connected to a DM signal line of the signal line LC. These first and second switch elements are switched on in the first period T1 and off in the second period T2.

One end of the second switch circuit 42 is connected to the second bus BS2, and the second switch circuit 42 is switched on in the first period T1 and off in the second period T2. The second switch circuit 42 is constituted by a third switch element for signals DP and a fourth switch element for signals DM, for example. One end of the third switch element is connected to the DP signal line of the second bus BS2, and the other end is connected to the DP signal line of the signal line LC. One end of the fourth switch element is connected to the DM signal line of the second bus BS2, and the other end is connected to the DM signal line of the signal line LC. These third and fourth switch elements are switched on in the first period T1 and off in the second period T2.

The first and second switch elements that constitute the first switch circuit 41 and the third and fourth switch elements that constitute the second switch circuit 42 may be constituted by transfer gates, for example, but are desirably constituted by N-type transistors. For example, these switch elements are constituted by MOS transistors. According to this configuration, it is possible to reduce parasitic capacitance due to drain capacitance and source capacitance of the transistor. In addition, a switch signal generation circuit that has a charge pump circuit that performs a charge pump operation based on a charge pump clock signal may be provided in the circuit device 10. The switch signal generation circuit generates a switch signal based on a boosted power supply voltage that was boosted by the charge pump circuit, and supplies the switch signal to the bus switch circuit 40. For example, the switching on and off of the first to fourth switch elements of the bus switch circuit 40 is controlled using a switch signal generated based on a boosted power supply voltage. If a switch signal that is based on a boosted power supply voltage is used in this manner, it is possible to lower on-resistance of a transistor that constitutes a switch element of the bus switch circuit 40, and it is possible to appropriately switch on or off the switch element. In this case, the charge pump circuit performs a charge pump operation when the first bus BS1 and the second bus BS2 are connected, and also performs a charge pump operation when the first bus BS1 and the second bus BS2 are not connected. According to this configuration, it is possible to prevent a situation in which a long starting time of the charge pump circuit becomes time lag, for example, when the second period T2 in FIG. 6 switches to the first period T1 in FIG. 5, and it is not possible to supply a switch signal at an appropriate boosted voltage level. In addition, in the first period T1, the charge pump circuit performs a charge pump operation based on a clock signal of a first frequency, and, in the second period T2, performs a charge pump operation based on a clock signal of a second frequency that is lower than the first frequency. According to this configuration, in the first period T1, it is possible to supply, to the bus switch circuit 40, a switch signal that is based on a boosted power supply voltage that has been appropriately boosted, and, in the second period T2, it is possible to reduce switch noise caused by the charge pump operation.

The signal line LC is connected to the other end of the first switch circuit 41 and the other end of the second switch circuit 42. It can be said that the signal line LC is a bypass signal line between the first bus BS1 and the second bus BS2. For example, the signal line LC has a DP signal line, which is connected to the DP signal line of the first bus BS1 via the first switch circuit 41, and is connected to the DP signal line of the second bus BS2 via the second switch circuit 42. In addition, the signal line LC has a DM signal line, which is connected to the DM signal line of the first bus BS1 via the first switch circuit 41, and is connected to the DM signal line of the second bus BS2 via the second switch circuit 42.

As described above, in this embodiment, the bus switch circuit 40 switches on the connection between the first bus BS1 and the second bus BS2 in the first period T1, and switches off this connection in the second period T2. Also, in the second period T2, packets are transferred on the transfer route TR2 that passes through the first physical layer circuit 11, the processing circuit 20, and the second physical layer circuit 12. Accordingly, it is possible to realize high-quality signal transfer in which degraded signal characteristics of USB transmission signals are improved.

In this embodiment, the first switch circuit 41 and the second switch circuit 42 are provided in the bus switch circuit 40 that electrically connects and disconnects the first bus BS1 and the second bus BS2. Moreover, one end of the first switch circuit 41 is connected to the first bus BS1, and the first switch circuit 41 is switched on in the first period T1 and off in the second period T2. In addition, one end of the second switch circuit 42 is connected to the second bus BS2, and the second switch circuit 42 is switched on in the first period T1 and off in the second period T2. The signal line LC is provided between the first switch circuit 41 and the second switch circuit 42, and the signal line LC is connected to the other end of the first switch circuit 41 and the other end of second switch circuit 42. According to this configuration, in the first period T1, the first bus BS1 and the second bus BS2 are electrically connected when the first switch circuit 41 and the second switch circuit 42 are switched on. On the other hand, in the second period T2, the first bus BS1 and the second bus BS2 are electrically disconnected when the first switch circuit 41 and the second switch circuit 42 are switched off. Accordingly, it is possible to realize the bus switch circuit 40 that switches on the connection between the first bus BS1 and the second bus BS2 in the first period T1, and off in the second period T2.

In addition, according to this embodiment, by providing two switch circuits in the bus switch circuit 40 in this manner, it is possible to reduce parasitic capacitance resulting from wiring capacitance. For example, by providing the first switch circuit 41 and the second switch circuit 42 in the bus switch circuit 40, it is possible to shorten the wiring length of a first signal line that connects the bus switch circuit 40 and the first bus BS1 and a second signal line that connects the bus switch circuit 40 and the second bus BS2. Accordingly, it is possible to reduce parasitic capacitance resulting from the wiring capacitance of these signal lines. For example, in the second period T2 in which connection by the bus switch circuit 40 is switched off, high-speed HS communication is performed as will be described later. Therefore, if the wiring capacitance of the first signal line that connects the first bus BS1 and the bus switch circuit 40 and the second signal line that connects the second bus BS2 and the bus switch circuit 40 is large, HS communication is negatively affected.

In this regard, according to this embodiment, the first switch circuit 41 and the second switch circuit 42 are provided in the bus switch circuit 40, and thus, a layout arrangement of the first switch circuit 41 and the second switch circuit 42 that shortens the above-described first and second signal lines is possible. Accordingly, it is possible to reduce the wiring capacitance of the first signal line and the second signal line, and it is possible to reduce the negative influence that the wiring capacitance of these signal lines has on HS communication in the second period T2. In addition, due to the wiring length of the first and second signal lines being shortened, the wiring length of the signal line LC is increased accordingly, and the wiring capacitance of the signal line LC increases. However, in the second period T2 during which high-speed HS communication is performed, when the first switch circuit 41 and the second switch circuit 42 are switched off, the signal line LC is electrically disconnected from the first bus BS1 and the second bus BS2. Therefore, even if the wiring length of the signal line LC increases and the wiring capacitance of the signal line LC increases, no significant problem occurs. Therefore, according to the circuit device 10 in this embodiment, it is possible to reduce the wiring capacitances of the first signal line that connects the first bus BS1 and the bus switch circuit 40 and the second signal line that connects the second bus BS2 and the bus switch circuit 40, and it is possible to prevent degradation in the signal characteristics due to this wiring capacitance or the like.

Figure 3:
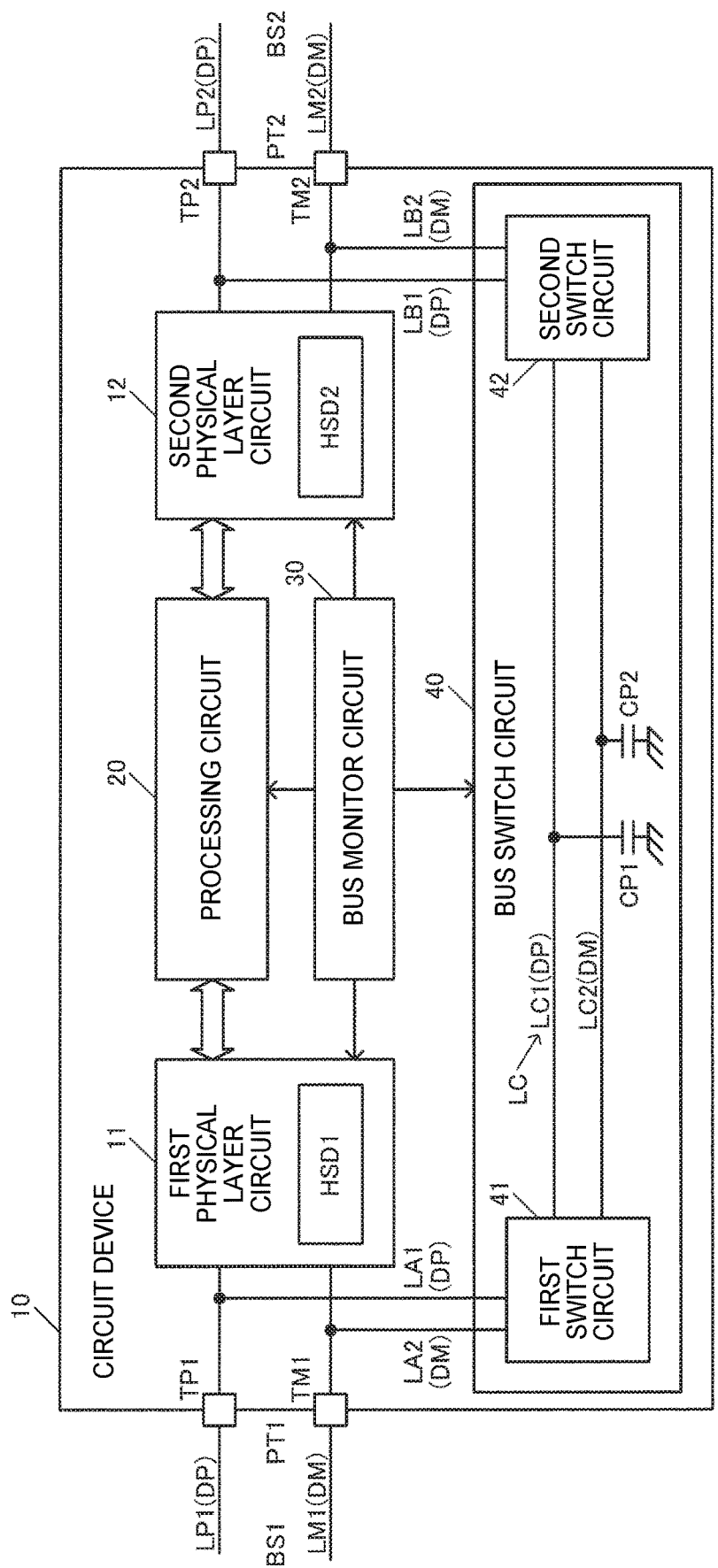
FIG. 3 shows a detailed configuration example of the circuit device.

FIG. 3 shows a detailed configuration example of the circuit device 10. In FIG. 3, the circuit device 10 includes a bus monitor circuit 30. The bus monitor circuit 30 performs a monitor operation of monitoring the first bus BS1 and the second bus BS2. For example, this is a monitor operation for monitoring the state of at least one of the first bus BS1 and the second bus BS2. Specifically, the bus monitor circuit 30 performs a monitor operation of monitoring the first bus BS1 or the second bus BS2, using the first physical layer circuit 11 or the second physical layer circuit 12. More specifically, this is a monitor operation for monitoring the state of the first bus BS1 or the second bus BS2 based on signals from the first physical layer circuit 11 or the second physical layer circuit 12. The bus switch circuit 40 then switches on or off the connection between the first bus BS1 and the second bus BS2 based on the monitoring result from the bus monitor circuit 30. For example, based on the monitoring result from the bus monitor circuit 30, the bus switch circuit 40 switches on the connection between the first bus BS1 and the second bus BS2 in the first period T1, and switches off this connection in the second period T2. Also, the processing circuit 20 performs transfer processing shown in FIG. 6 in the second period T2. Accordingly, predetermined signal processing such as packet bit resynchronization processing is executed by the processing circuit 20. In other words, packet repeat processing is performed. Accordingly, it is possible to realize high-quality signal transfer in which degraded signal characteristics of USB transmission signals are improved.

In addition, in FIG. 3, the first physical layer circuit 11 includes a first HS driver HSD1, and the second physical layer circuit 12 includes a second HS driver HSD2. Note that, for ease of description, the first HS driver HSD1 and the second HS driver HSD2 are simply referred to as "HS driver HSD1" and "HS driver HSD2" as appropriate. The HS drivers HSD1 and HSD2 are HS-mode transmission circuits, and drive the DP and DM signal lines of the USB through current driving. The HS drivers HSD1 and HSD2 include a first switch element and a second switch element, and one end of each of these switch elements is connected to a constant current circuit, and each of the other ends is respectively connected the DP signal line and the DM signal line. In addition, a third switch element that has one end connected to the constant current circuit and another end connected to a VSS line may be included.

In addition, the circuit device 10 in FIG. 3 includes a first terminal TP1 to which a DP signal line LP1 of the first bus BS1 is connected and a second terminal TM1 to which a DM signal line LM1 of the first bus BS1 is connected. A third terminal TP2 to which a DP signal line LP2 of the second bus BS2 is connected and a fourth terminal TM2 to which a DM signal line LM2 of the second bus BS2 is connected are also included. Note that, for ease of description, the first terminal TP1, the second terminal TM1, the third terminal TP2, and the fourth terminal TM2 are simply referred to as "terminal TP1", "terminal TM1", "terminal TP2", and "terminal TM2" as appropriate. The terminals TP1, TM1, TP2, and TM2 are pads of the circuit device 10, for example. The terminals TP1 and TM1 are terminals on a port PT1 side, and the port PT1 is an INT port of the circuit device 10. The terminals TP2 and TM2 are terminals on a port PT2 side, and the port PT2 is an EXT port of the circuit device 10. As shown in later-described FIG. 12, the port PT1 is arranged on one of two sides of the circuit device 10 that oppose each other, and the port PT2 is arranged on the other of the two sides. The first physical layer circuit 11 and one end of the bus switch circuit 40 are connected to the first bus BS1 via the terminals TP1 and TM1 of the port PT1. The second physical layer circuit 12 and the other end of the bus switch circuit 40 are connected to the second bus BS2 via the terminals TP2 and TM2 of the port PT2.

The bus switch circuit 40 includes the first switch circuit 41, the second switch circuit 42, and signal lines LC1 and LC2. The signal lines LC1 and LC2 correspond to the signal line LC in FIG. 2, the signal line LC1 is a DP signal line, and the signal line LC2 is a DM signal line. CP1 denotes a wiring capacitance that is a parasitic capacitance of the signal line LC1. CP2 denotes a wiring capacitance that is a parasitic capacitance of the signal line LC2. One end of the first switch circuit 41 is connected to the first bus BS1 via signal lines LA1 and LA2 and the terminals TP1 and TM1. One end of the second switch circuit 42 is connected to the second bus BS2 via signal lines LB1 and LB2 and the terminals TP2 and TM2. In addition, the other end of the first switch circuit 41 is connected to the other end of the second switch circuit 42 via the signal lines LC1 and LC2. Here, the signal line LA1 is a DP signal line that connects the first switch circuit 41 and the terminal TP1, and the signal line LA2 is a DM signal line that connects the first switch circuit 41 and the terminal TM1. The signal line LB1 is a DP signal line that connects the second switch circuit 42 and the terminal TP2, and the signal line LB2 is a DM signal line that connects the second switch circuit 42 and the terminal TM2.

Specifically, the first switch circuit 41 includes the first switch element, one end of which is connected to the DP signal line LP1 of the first bus BS1, and the second switch element, one end of which is connected to the DM signal line LM1 of the first bus BS1. Specifically, the one end of the first switch element is connected to the DP signal line LP1 of the first bus BS1 via the signal line LA1 and the terminal TP1. Also, the one end of the second switch element is connected to the DM signal line LM1 of the first bus BS1 via the signal line LA2 and the terminal TM1. The signal line LC1 that is a DP signal line of the signal line LC is connected to the other end of the first switch element, and the signal line LC2 that is a DM signal line of the signal line LC is connected to the other end of the second switch element. In addition, the second switch circuit 42 has the third switch element, one end of which is connected to the DP signal line LP2 of the second bus BS2, and the fourth switch element, one end of which is connected to the DM signal line LM2 of the second bus BS2. Specifically, the one end of the third switch element is connected to the DP signal line LP2 of the second bus BS2 via the signal line LB1 and the terminal TP2. The one end of the fourth switch element is connected to the DM signal line LM2 of the second bus BS2 via the signal line LB2 and the terminal TM2.

Figure 4:
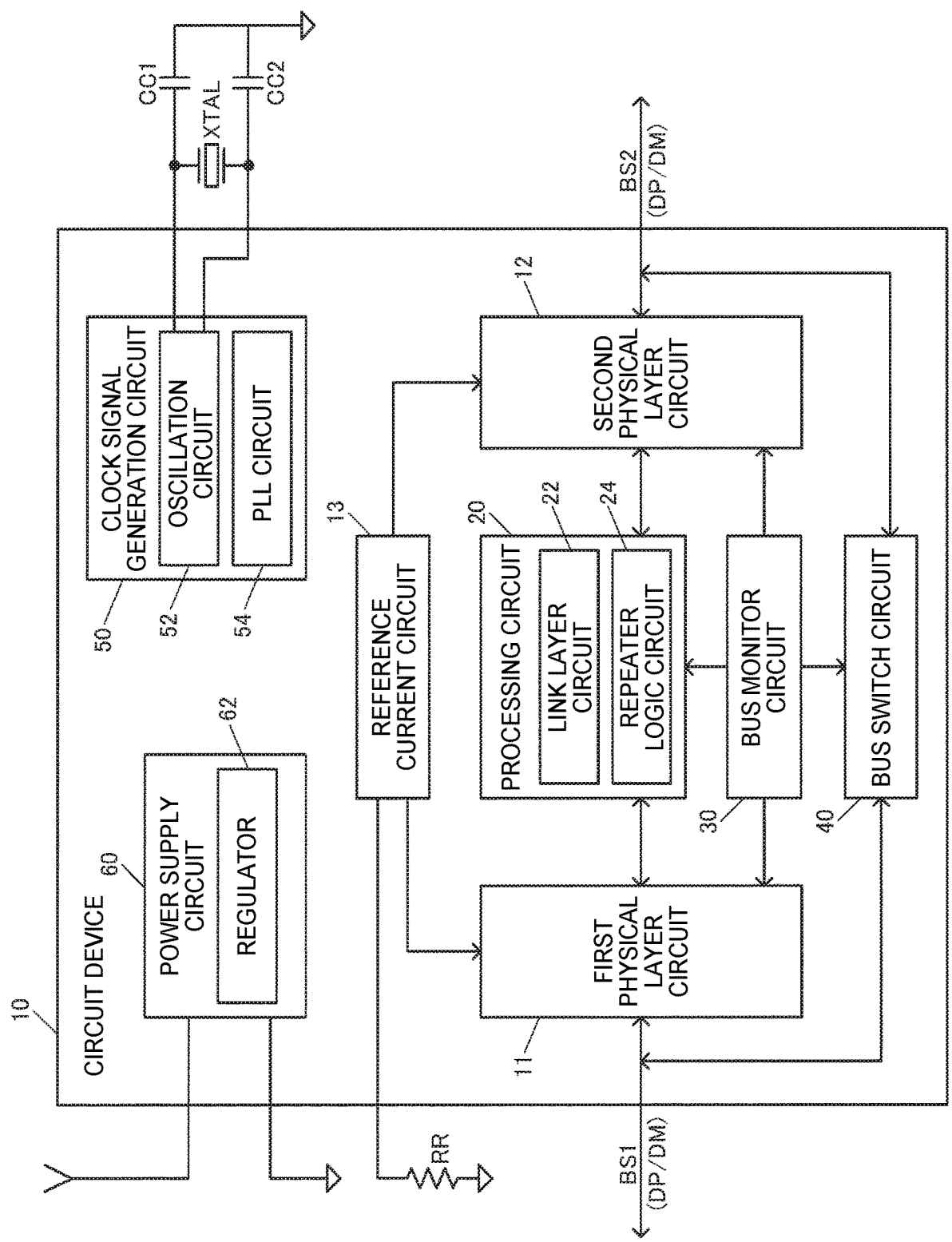
FIG. 4 shows a specific configuration example of the circuit device.

FIG. 4 shows a specific configuration example of the circuit device 10. In FIG. 4, the circuit device 10 further includes a reference current circuit 13, a clock signal generation circuit 50, and a power supply circuit 60. The reference current circuit 13 is a circuit for generating a reference current used in the first and second physical layer circuits 11 and 12, and generates a reference current by using a resistor RR that is an external component. The clock signal generation circuit 50 is a circuit that generates various types of clock signals used in the circuit device 10, and includes an oscillation circuit 52 and a PLL circuit 54. The oscillation circuit 52 is connected to an oscillator XTAL and capacitors CC1 and CC2, which are external components. The oscillator XTAL is realized by a quartz resonator or the like. The oscillation circuit 52 performs an oscillation operation of the oscillator XTAL, and generates a clock signal based on an oscillation signal. The PLL circuit 54 generates a multiphase clock signal based on a generated clock signal. The power supply circuit 60 receives a voltage from an external power supply, and generates various types of power supply voltages for use in the circuit device 10. Specifically, a regulator 62 of the power supply circuit 60 regulates the voltage from the external power supply, generates a power supply voltage that is lower than the voltage from the external power supply, and supplies the generated power supply voltage to various circuit blocks of the circuit device 10.

The processing circuit 20 includes a link layer circuit 22, a repeater logic circuit 24, and the like. The link layer circuit 22 is a circuit that performs processing that corresponds to the link layer. The link layer circuit 22 performs serial-to-parallel conversion processing for converting serial data received via the USB into parallel data, parallel-to-serial conversion processing for converting parallel data into serial data for transmission, processing for NRZI encoding and decoding, and the like. The repeater logic circuit 24 performs logic processing for transmitting packets received from the first bus BS1 to the second bus BS2, and transmitting packets received from the second bus BS2 to the first bus BS1. For example, the bits of a received packet are sampled using a clock signal, and serial data obtained by the sampling is converted into parallel data. Also, parallel data that has been subjected to various types of logic processing such as NRZI is converted into serial data and transmitted in synchronization with a clock signal in the circuit device 10. According to this configuration, predetermined signal processing such as packet bit resynchronization processing (resynchronization) is realized.

Figure 5:
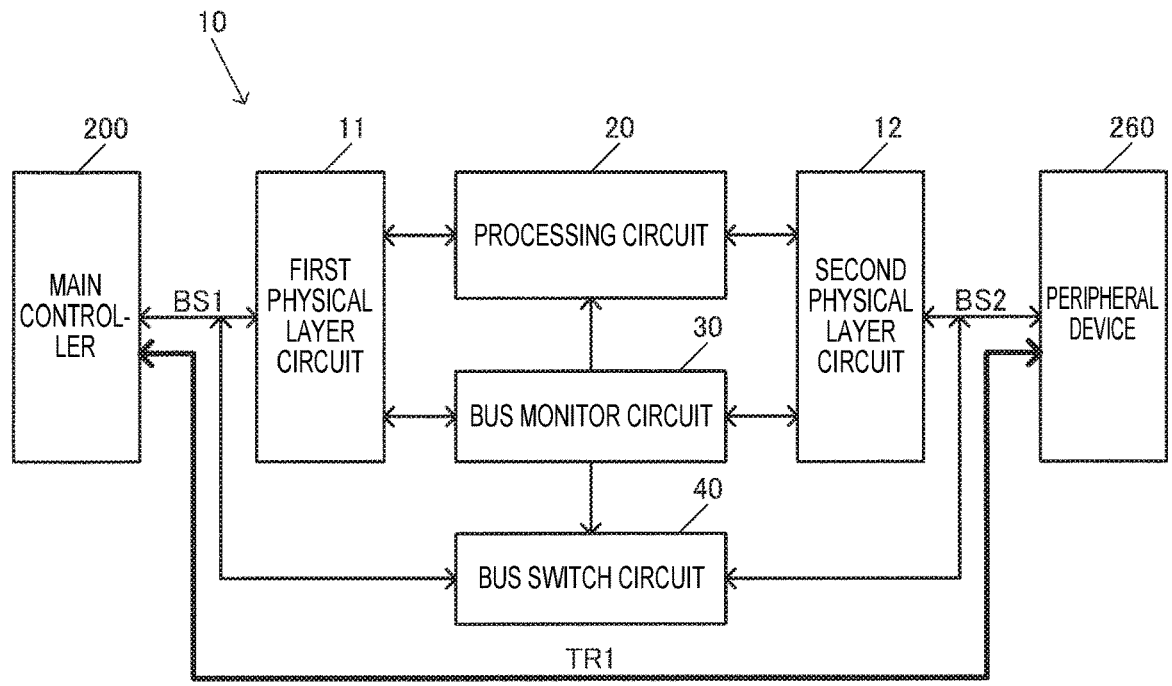
FIG. 5 is an illustrative diagram of operations of the circuit device.
Figure 6:
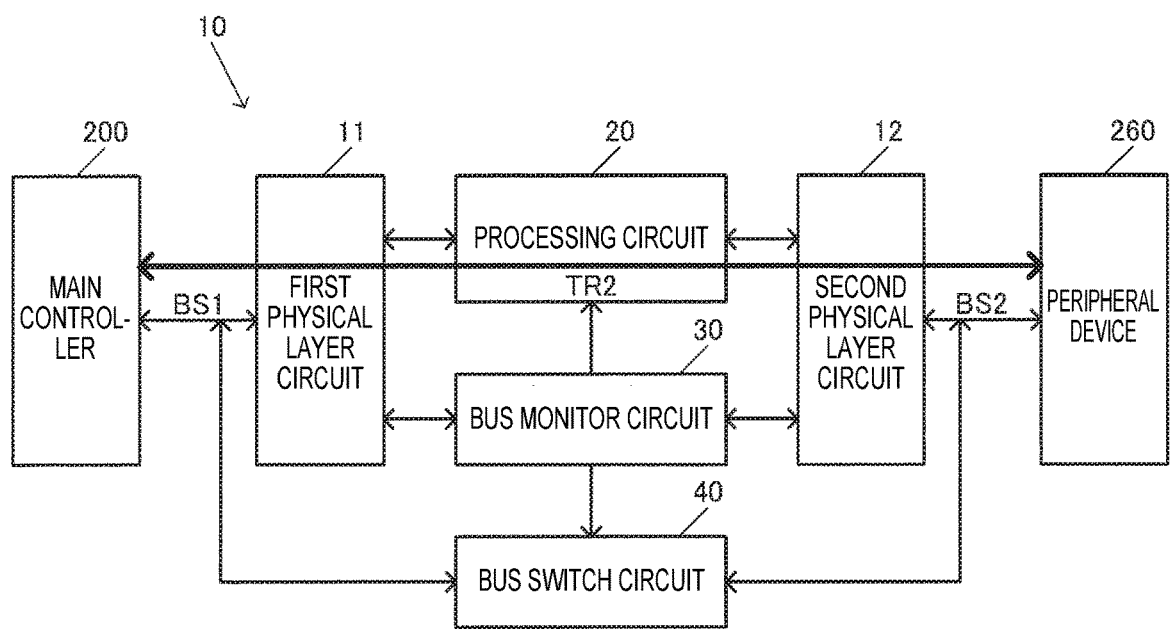
FIG. 6 is an illustrative diagram of operations of the circuit device.

FIGS. 5 and 6 are illustrative diagrams of operations of the circuit device 10 of this embodiment. As shown in FIG. 5, in the first period T1, the bus switch circuit 40 switches on the connection between the first bus BS1 and the second bus BS2. For example, when a switching control signal from the bus monitor circuit 30 becomes active, the switch elements respectively provided in correspondence with the DP and DM signal lines are switched on, and the first bus BS1 and the second bus BS2 become electrically connected. Accordingly, the main controller 200 connected to the first bus BS1 and the peripheral device 260 connected to the second bus BS2 are able to perform USB signal transfer on a transfer route TR1 that includes the first bus BS1, the bus switch circuit 40, and the second bus BS2. In other words, it is possible to perform signal transfer by using signals DP and DM. On the other hand, as shown in FIG. 6, in the second period T2 after the first period T1, the bus switch circuit 40 switches off the connection between the first bus BS1 and the second bus BS2. For example, when a switching control signal from the bus monitor circuit 30 becomes inactive, the switch elements respectively provided in correspondence with signals DP and DM are switched off, and the first bus BS1 and the second bus BS2 become electrically disconnected. In this second period T2, the processing circuit 20 performs transfer processing for transferring packets between the first bus BS1 and the second bus BS2 via the first and second physical layer circuits 11 and 12. In other words, packet transfer processing is performed on the transfer route TR2. For example, in the second period T2, when a transfer processing instruction signal from the bus monitor circuit 30 becomes active, the processing circuit 20 starts packet transfer processing on the transfer route TR2. In this transfer processing, predetermined signal processing such as packet bit resynchronization processing is performed, and an improvement in signal quality is realized.

As described above, in this embodiment, the circuit device 10 is provided with the processing circuit 20 that transfers packets between the first bus BS1 and the second bus BS2 via the first and second physical layer circuits 11 and 12, the bus monitor circuit 30 that monitors the buses, and the bus switch circuit 40 that switches on and off the connection between the first bus BS1 and the second bus BS2 based on a monitoring result. According to this configuration, for example, even if the signal characteristics of signals on the first bus BS1 and the second bus BS2 has degraded, the degraded signal characteristics can be improved by performing predetermined signal processing such as packet bit resynchronization processing on the transfer route TR2 in FIG. 6.

For example, if the cable 224 is long as shown in FIG. 1, or a large parasitic capacitance or parasitic resistance exists on the transfer route, there is a problem that the signal characteristics degrade a large amount, and appropriate signal transfer cannot be realized. In view of this, if the circuit device 10 of this embodiment is arranged between the main controller 200 and the portable terminal device 250, which is the peripheral device 260, it is possible to improve the degraded signal characteristics. Accordingly, it is possible to realize appropriate signal transfer between the main controller 200 and the portable terminal device 250.

Also, in this embodiment, the states of the first bus BS1 and the second bus BS2 are monitored by the bus monitor circuit 30, and the connection between the first bus BS1 and the second bus BS2 is switched on and off by the bus switch circuit 40 based on the monitoring result. Accordingly, in the first period T1, which is before high-speed packet transfer in the HS mode is performed for example, the first bus BS1 and the second bus BS2 can be electrically connected by the bus switch circuit 40 as shown in FIG. 5. Accordingly, in this first period T1, a signal can be transferred between the main controller 200 and the peripheral device 260 by using signals DP and DM, and various types of exchanges can be performed prior to HS mode packet transfer. Then, in the second period T2, as shown in FIG. 6, the connection between the first bus BS1 and the second bus BS2 is switched off, and HS mode packet transfer is performed on the transfer route TR2. During this packet transfer, packet bit resynchronization is performed, thus making it possible to realize high-quality packet transfer that improves degraded signal characteristics as described with reference to FIG. 1.

Note that the USB-HUB 210 shown in FIG. 1 has a product ID and a vender ID in accordance with the USB standard. In contrast, the circuit device 10 of this embodiment does not have such a product ID or vender ID, and the circuit device 10 of this embodiment is different from the USB-HUB 210 in this respect.

Also, as a circuit device for improving degraded signal characteristics, there is also a circuit device called a redriver that uses an analog circuit to perform amplitude adjustment and eye adjustment for the signals DP and DM. However, a redriver does not perform packet transfer on the transfer route TR2 shown in FIG. 6, and therefore cannot improve the signal characteristic of degraded signals with resynchronization processing, and thus is different from the circuit device 10 of this embodiment in this respect.

Also, the peripheral device 260 in FIGS. 5 and 6 may be able to switch between the role of the host and the role of the device, as with CarPlay and USB OTG (On-The-GO). For example, assume that the portable terminal device 250 in FIG. 1 is the peripheral device 260 that can perform CarPlay or the like. In this case, a technique is conceivable in which a USB-HUB for improving degraded signal characteristics is arranged between the main controller 200 and the peripheral device 260. However, in the case where the peripheral device 260 is the host, the host peripheral device 260 is connected to the downstream port of the USB-HUB, and there is a problem that appropriate packet transfer cannot be realized. In view of this, the circuit device 10 of this embodiment has an advantage in that, unlike the USB-HUB, even in the case where the role of the peripheral device 260 connected to the second bus BS2 in FIGS. 5 and 6 for example is switched to the role of the host, it is possible to handle this case. For example, it is sufficient that switch processing and setting processing regarding the host and device roles is performed in the first period T1. After it has been determined that the role of the peripheral device 260 is the host or the device, it is sufficient to perform packet transfer on the transfer route TR2 in the second period T2 as shown in FIG. 6. Accordingly, with the technique of this embodiment, there is an advantage that even if the peripheral device 260 is a CarPlay device for example, it is possible to realize appropriate packet transfer.

3. Switch Circuit

Figure 7:
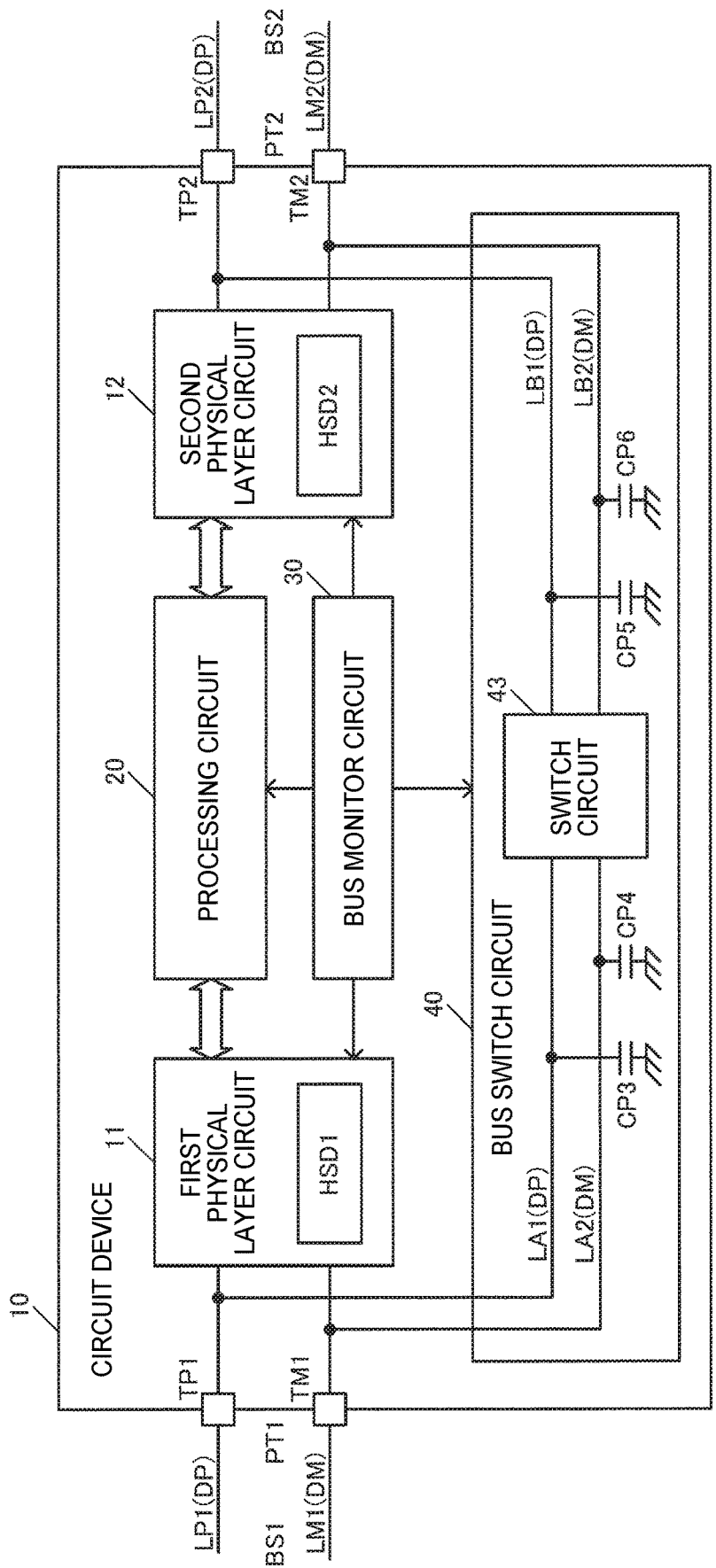
FIG. 7 shows a configuration example of a circuit device of a comparison example.

By arranging the circuit device 10 in this embodiment that has been described above on a route between the main controller 200 and the USB receptacle 226 in FIG. 1 for example, it is possible to prevent degradation of signal characteristics such as attenuation in the amplitude of an HS transmission waveform and an increase in jitter. However, it has been found that, in a configuration in which the bus switch circuit 40 is provided between the port PT1 that is the INT port of the circuit device 10 and the port PT2 that is the EXT port, there is a problem of degradation in the signal characteristics due to the wiring capacitance of a signal line that is routed on a route that includes the bus switch circuit 40. This problem will be described below. FIG. 7 shows a configuration example of a comparison example of this embodiment for illustrating this problem.

In the comparison example in FIG. 7, only one switch circuit 43 is provided for the bus switch circuit 40. In addition, the terminals TP1 and TM1 of the port PT1 on the first bus BS1 side are connected to one end of the switch circuit 43 via the signal lines LA1 and LA2. CP3 and CP4 denote wiring capacitances that become parasitic capacitances of these signal lines LA1 and LA2. In addition, the terminals TP2 and TM2 of the port PT2 on the second bus BS2 side are connected to the other end of the switch circuit 43 via the signal lines LB1 and LB2. CP5 and CP6 denote wiring capacitances that become parasitic capacitances of these signal lines LB1 and LB2. According to this configuration in the comparison example, in addition to input capacitance on one end side of the switch circuit 43, the wiring capacitances CP3 and CP4 of the signal lines LA1 and LA2 are added as input capacitance of the first physical layer circuit 11. Therefore, the input capacitance of the first physical layer circuit 11 increases. Also, in addition to the input capacitance on the other end side of the switch circuit 43, the wiring capacitances CP5 and CP6 of the signal lines LB1 and LB2 are added as input capacitance of the second physical layer circuit 12. Thus, the input capacitance of the second physical layer circuit 12 increases. If the input capacitances of the first and second physical layer circuits 11 and 12 increase in this manner, a problem of degradation of the signal characteristics of an HS transmission waveform occurs during HS packet transfer in the second period T2 in FIG. 6.

For example, in the case where the circuit device 10 is arranged on a route between the main controller 200 and the USB receptacle 226 in FIG. 1, the circuit device 10 receives, at the port PT1, packets transmitted by the main controller 200, and transmits, from the port PT2, repeat packets corresponding to the received packets. In addition, the circuit device 10 receives, at the port PT2, packets transmitted by the portable terminal device 250, and transmits repeat packets thereof from the port PT1. In addition, as shown in later-described FIG. 12, it is desirable that the port PT1 and the port PT2 are arranged on opposing sides of the circuit device 10. For example, in FIG. 12, the port PT1 on the first bus BS1 side is arranged on a first side SD1 of the circuit device 10, and the port PT2 on the second bus BS2 side is arranged on a second side SD2 that opposes the first side SD1 of the circuit device 10. Therefore, the distance between the port PT1 and the port PT2 on the IC chip of the circuit device 10 becomes longer and the wiring lengths of the signal lines LA1, LA2, LB1, and LB2 also become longer, and thus the wiring capacitances CP3 and CP4, CP5, and CP6 also increase. In particular, if the wiring widths of the signal lines LA1, LA2, LB1, and LB2 are increased in order to lower the wiring resistance between the ports PT1 and PT2, the wiring capacitances CP3 to CP6 further increase. As a result, the wiring capacitances CP3 to CP6 whose capacitance values are high are added to the input capacitances of the first physical layer circuit 11 and the second physical layer circuit 12, thus the input capacitances increase, and, as a result, the signal characteristics of an HS transmission waveform are degraded. On the other hand, if the wiring widths of the signal lines LA1, LA2, LB1, and LB2 are reduced in order to lower the wiring capacitance, and coupling-free routing is performed in order to eliminate parasitic components, problems of a significant change in the voltage of a chirp signal and the like are brought about due to a reduction in the degree of freedom of routing and an increase in the wiring resistance.

In view of this, in this embodiment, the switch circuits of the bus switch circuit 40 arranged between the port PT1 and the port PT2 are provided branching from each other. Specifically, as shown in FIGS. 2 and 3, the first switch circuit 41 and the second switch circuit 42 are provided in the bus switch circuit 40, and are connected to each other using the signal line LC. In addition, as will be described with reference to later-described FIG. 12, the first switch circuit 41 is arranged below the port PT1. Also, the second switch circuit 42 is arranged below the port PT2. In the first period T1 in FIG. 5, an LS/FS signal-related transaction is allowed to be performed on the transfer route TR1 via the first and second switch circuits 41 and 42 of the bus switch circuit 40 that have been switched on. On the other hand, a configuration is adopted in which, in the second period T2 in FIG. 6, the first and second switch circuits 41 and 42 of the bus switch circuit 40 are switched off, and HS packets are repeatedly transferred on the transfer route TR2 via the processing circuit 20. Note that, in FIG. 12, the first switch circuit 41 and the second switch circuit 42 are respectively arranged below the ports PT1 and PT2, but a configuration may be adopted in which the first switch circuit 41 is arranged right near the terminals TP1 and TM1 of the port PT1, and the second switch circuit 42 is arranged right near the terminals TP2 and TM2 of the port PT2. According to this configuration, it is also possible to ensure load symmetry of signals DP and DM.

Figure 12:
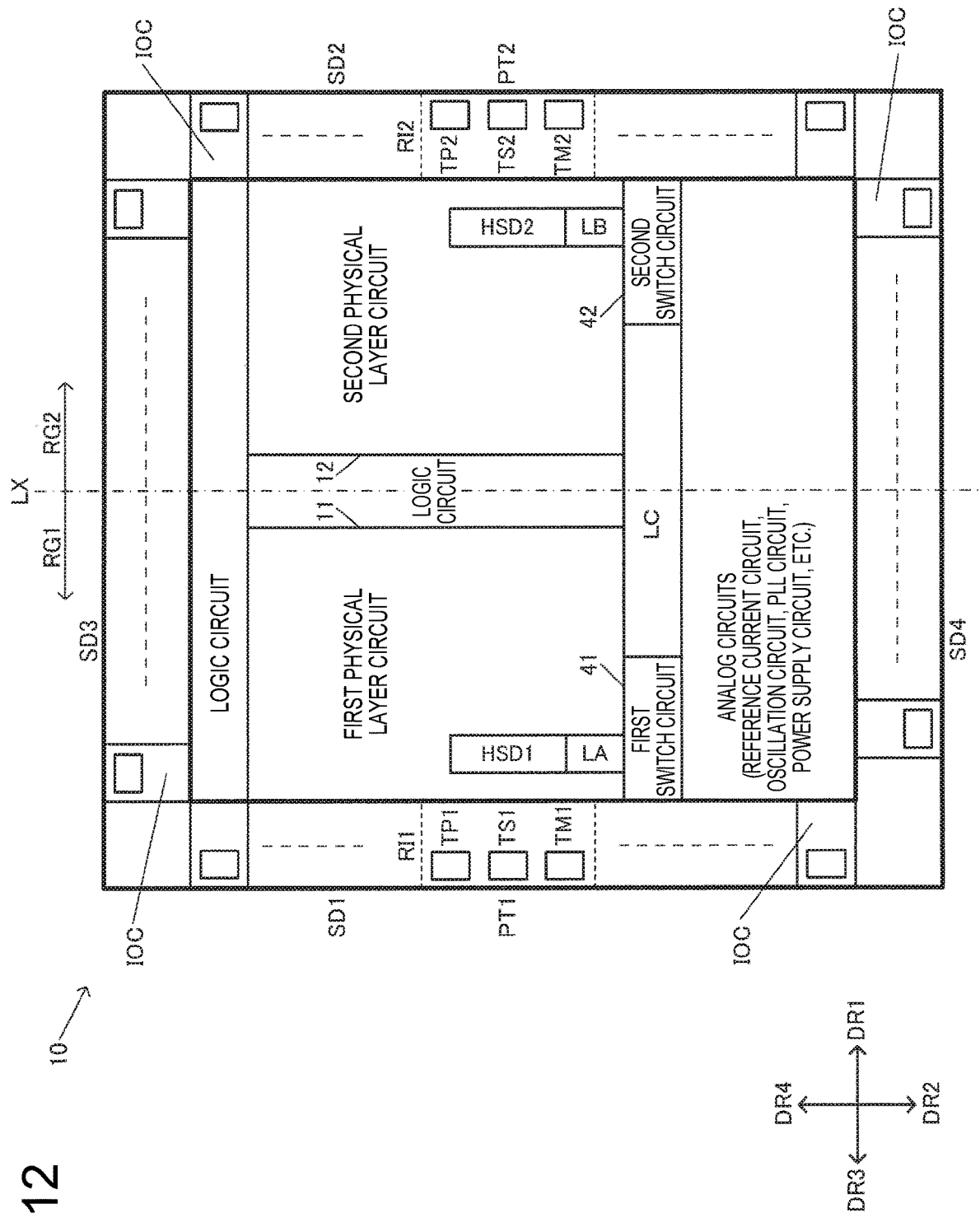
FIG. 12 shows a layout arrangement example of the circuit device.

According to the circuit device 10 of this embodiment that has been described above, during low-speed LS/FS signal transfer to be described in detail with reference to FIG. 24 below, both the first switch circuit 41 and the second switch circuit 42 are switched on and passage of transaction is allowed. At this time, a delay due to the wiring capacitance of the signal line LC between the first switch circuit 41 and the second switch circuit 42 affects the signal transfer, but since the speed of LS/FS signals is low, the influence of the delay can be sufficiently ignored. On the other hand, during high-speed HS signal transfer, both the first switch circuit 41 and the second switch circuit 42 are switched off. Accordingly, due to the first and second switch circuits 41 and 42 that have been switched off, the signal line LC can be electrically disconnected from the ports PT1 and PT2 of the USB. Accordingly, if the signal line LC is routed over a long distance from the first side SD1 of the circuit device 10 to the opposing second side SD2 as shown in FIG. 12, the signal line LC can also be electrically disconnected from the ports PT1 and PT2. Therefore, dominant components of the wiring capacitance of the signal line LC do not affect HS communication of the ports PT1 and PT2 of the USB, and thus it is possible to eliminate negative influence on the eye pattern of the USB. In addition, regarding the signal line LC, there is no need to worry about the influence of wiring capacitance during HS communication, and thus the wiring width of the signal line LC and the coupling capacitance with a periphery circuit are not of concern. Therefore, it is possible to ensure freedom of layout design, and layout routing that reduces wiring resistance of the signal line LC is possible.

Figure 8:
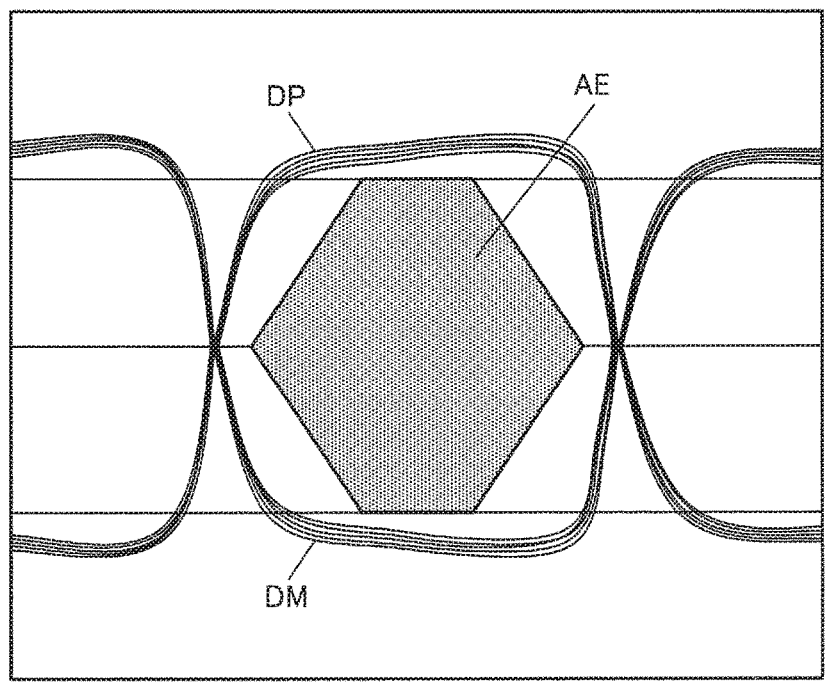
FIG. 8 shows an example of an eye pattern of USB of a circuit device of an embodiment of the present invention
Figure 9:
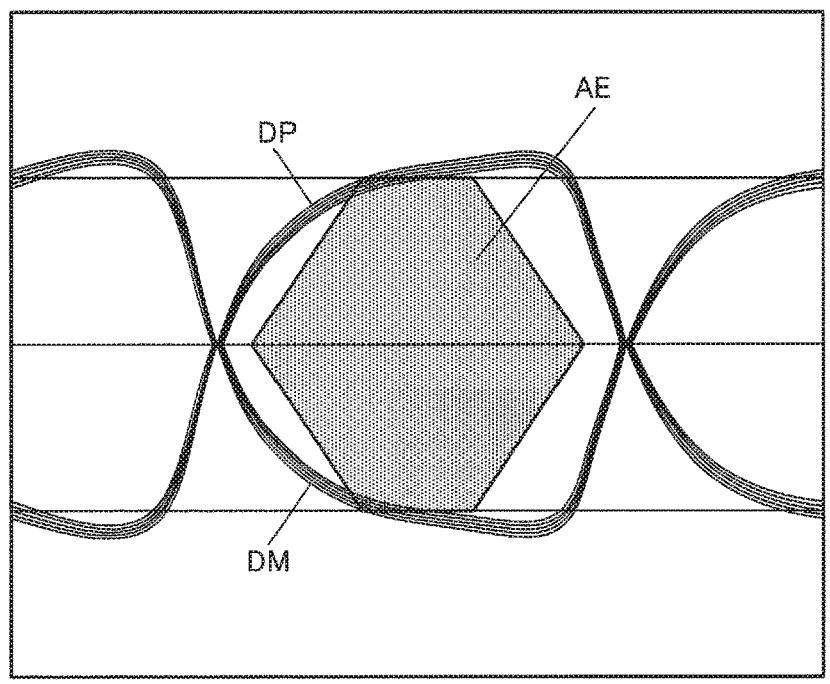
FIG. 9 shows an example of an eye pattern of USB of a circuit device of the comparison example.

FIGS. 8 and 9 show an eye pattern example in a USB authentication test. FIG. 8 shows an example of an eye pattern of the circuit device 10 of this embodiment, and FIG. 9 shows an example of an eye pattern in the comparison example in FIG. 7. Here, AE denotes a prohibition region of waveforms of signals DP and DM, and this prohibition region AE is stipulated in accordance with the USB standard. In USB technology, there are demands that waveforms of signals DP and DM do not overlap this prohibition region AE. According to the configuration in the comparison example in FIG. 7, due to wiring capacitances of the signal lines LA1, LA2, LB1, and LB2, rising waveforms of signals DP and DM become blunt, and, as shown in FIG. 9, a situation occurs in which waveforms of signals DP and DM overlap the prohibition region AE. Conversely, according to the circuit device 10 of this embodiment, by electrically shutting off the signal line LC from the ports PT1 and PT2 of the USB during HS communication, waveforms of signals DP and DM do not overlap the prohibition region AE as shown in FIG. 8, and it is possible to largely improve the signal characteristics during HS communication compared to the comparison example. Accordingly, by electrically shutting off the signal line LC from the ports PT1 and PT2 of the USB, the wiring capacitance of the signal line LC that is routed over a long distance in the circuit device 10 is not added as an input capacitance of the ports PT1 and PT2. As a result, as shown in FIG. 8, it is possible to largely improve bluntness of the waveforms of the signals DP and DM compared with FIG. 9, and a USB eye pattern authentication test can be easily passed.

As described above, according to the circuit device 10 of this embodiment, it is possible to electrically disconnect a large portion of wiring capacitance on a route including the bus switch circuit 40 during HS communication, and, as shown in FIG. 8, it is possible to suppress bluntness of a signal waveform during HS communication. In addition, by electrically shutting off the signal line LC on a route including the bus switch circuit 40 during HS communication, the degree of freedom of routing of the signal line LC is improved, and it is possible to set a wiring width and the like so as to lower the wiring resistance of the signal line LC. Accordingly, routing is possible without taking parasitic capacitance into great consideration, and it is possible to improve the degree of freedom of layout design. Accordingly, it is possible to improve the signal characteristics of a chirp signal and the like to be described later.

4. Layout Arrangement

Figure 10:
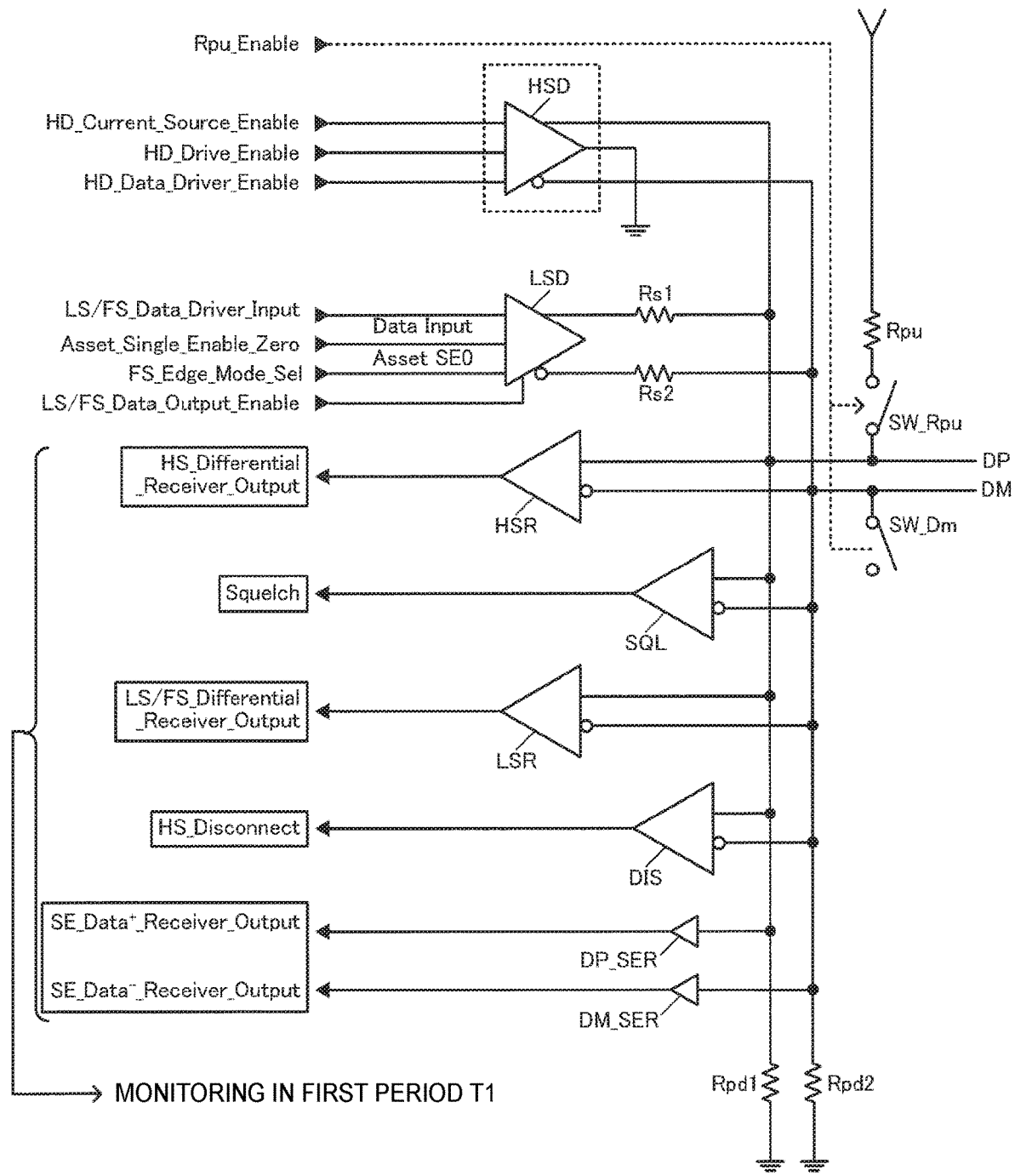
FIG. 10 shows a configuration example of a physical layer circuit.

Next, a layout arrangement technique of this embodiment will be described. First, circuit configurations of a physical layer circuit and an HS driver will be described. FIG. 10 shows a configuration example of a physical layer circuit. Here, the first physical layer circuit 11 and the second physical layer circuit 12 are collectively referred to as "physical layer circuits". Each physical layer circuit includes a pull-up resistor Rpu, switch elements SW_Rpu and SW_Dm, and pulldown resistors Rpd1 and Rpd2. The switch element SW_Rpu is switched on or off based on a control signal Rpu_Enable. This realizes a pull-up operation. In addition, each physical layer circuit includes an HS driver HSD that is a HS transmission circuit, an LS/FS driver LSD that is an LS/FS transmission circuit, and resistors Rs1 and Rs2. The HS driver HSD is a current driver that performs current driving, and the LS/FS driver LSD is a voltage driver that performs voltage driving. At the time of HS termination, by the driver LSD outputting an L level, the resistors Rs1 and Rs2 function as terminating resistors of 45Ω. When HS termination is disabled, output of the driver LSD enters a high impedance state. Note that an LS driver and an FS driver can be separately provided as the LS/FS driver LSD, for example.

In addition, each physical layer circuit includes an HS receiver HSR that is an HS differential reception circuit, a transmission envelope detector SQL that is a squelch detection circuit, a receiver LSR that is an LS/FS differential reception circuit, a disconnection envelope detector DIS that is a disconnection detection circuit, and single end receivers DP_SER and DM_SER that are single-end reception circuits.

In addition, in this embodiment, a bus monitor operation is performed by the bus monitor circuit 30 based on a signal from an analog circuit that constitutes a physical layer circuit. Specifically, as shown in FIG. 10, for example, the bus monitor circuit 30 performs a bus monitor operation based on signals from the HS receiver HSR, the squelch transmission envelope detector SQL, the LS/FS receiver LSR, the disconnection envelope detector DIS for disconnection detection, or the single end receivers DP_SER and DM_SER. Specifically, the bus monitor circuit 30 can monitor states of a bus such as a device chirp K, a host chirp K/J, idle, reset, suspend, resume, SE0, J, K, bus reset, or HS disconnection, based on signals from these analog circuits. The bus monitor circuit 30 then controls switching on or off of connection of the bus switch circuit 40 and controls switching on or off of transfer processing of the processing circuit 20, based on the monitoring result. According to this configuration, it is possible to realize appropriate switch control of the bus switch circuit 40 and transfer control of the processing circuit 20 in which the states of the bus are appropriately determined.

Figure 11:
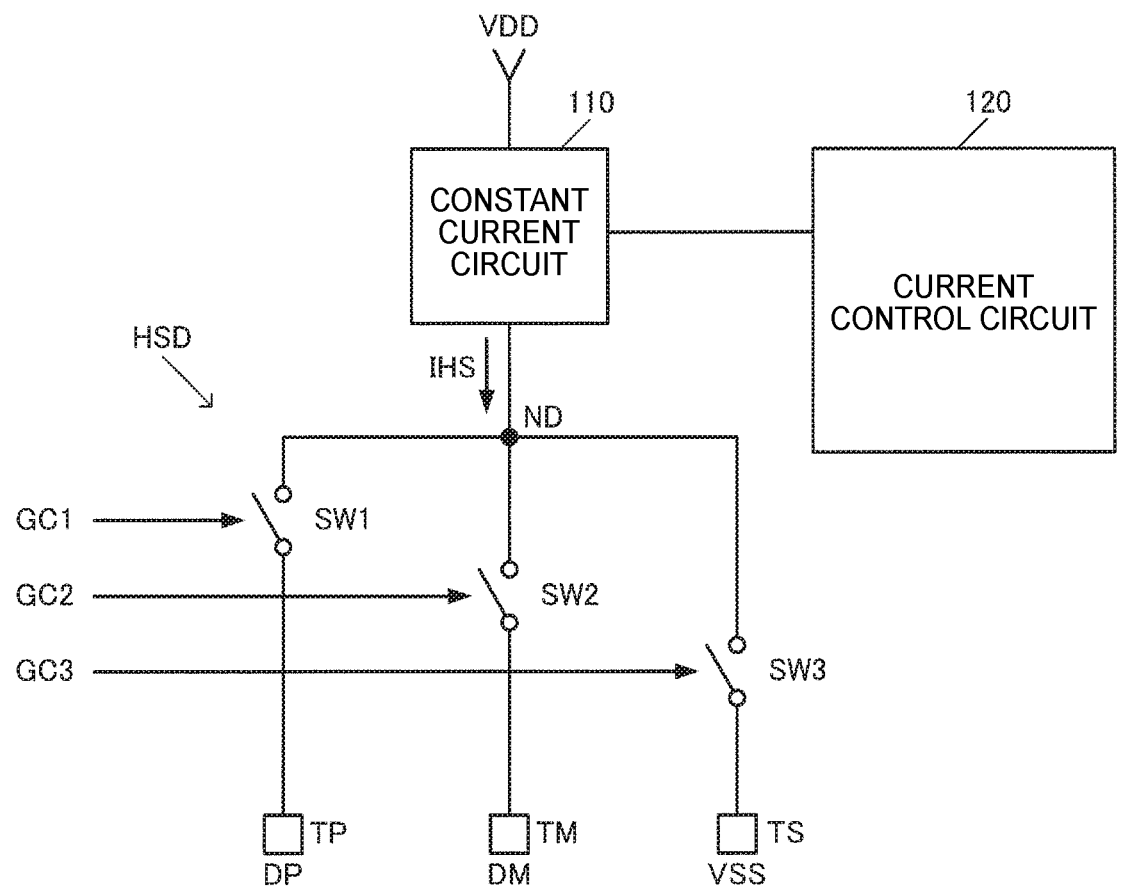
FIG. 11 shows a configuration example of an HS driver.

FIG. 11 shows a configuration example of the HS driver HSD. This HS driver HSD corresponds to the HS drivers HSD1 and HSD2 in FIG. 3. The HS driver HSD includes a DP switch element SW1 and a DM switch element SW2. In addition, a VSS switch element SW3 can be further included. The switch element SW1 is provided between a node ND to which a current IHS from a constant current circuit 110 is supplied and a terminal TP of a signal DP, and the switching on and off of the switch element SW1 is controlled based on a control signal GC1. The switch element SW2 is provided between the node ND and a terminal TM of a signal DM, and switching on and off of the switch element SW2 is controlled based on a control signal GC2. The switch element SW3 is provided between the node ND and a VSS terminal TS, and the switching on and off of the switch element SW3 is controlled based on a control signal GC3. The constant current circuit 110 is provided between a VDD node and the node ND, and supplies a current IHS whose current value is set by a current control circuit 120. Note that the terminal TP corresponds to the terminals TP1 and TP2 in FIG. 3 and FIG. 12 that is to be described later, the terminal TM corresponds to the terminals TM1 and TM2, and the terminal TS corresponds to terminals TS1 and TS2.

The HS driver HSD in FIG. 11 current-drives the DP and DM signal lines of the USB bus via the switch element SW1 or the switch element SW2 using the current IHS from the constant current circuit 110. Specifically, when the control signal GC1 becomes active, the switch element SW1 is switched on, and the current IHS from the constant current circuit 110 flows to the DP signal line side via the switch element SW1. When the control signal GC2 becomes active, the switch element SW2 is switched on, and the current IHS from the constant current circuit 110 flows to the DM signal line side via the switch element SW2. Here, terminating resistors are connected to the DP and DM signal lines. Therefore, when the control signal GC1 becomes active, and the control signal GC2 becomes inactive, a J state occurs in which the voltage of the signal DP is 400 mV, and the voltage of the signal DM is 0 V. When the control signal GC1 becomes inactive, and the control signal GC2 becomes inactive, a K state occurs in which the voltage of the signal DP is 0 V, and the voltage of the signal DM is 400 mV. By bringing the USB bus state into the J state or the K state using the control signals GC1 and GC2 in this manner, it is possible to perform data transfer via the USB. Note that, in a period other than an HS transmission period, when the control signal GC3 becomes active, the current IHS from the constant current circuit 110 flows to the VSS side via the switch element SW3.

FIG. 12 shows a layout arrangement example of the circuit device 10 of this embodiment. FIG. 12 is a plan view of the circuit device 10 when viewed in planar view in a direction orthogonal to the semiconductor substrate, and is a plan view of a surface on which circuit elements are formed. In this planar view, the circuit device 10 has a first side SD1, a second side SD2, a third side SD3, and a fourth side SD4. Note that, for ease of description, the first side SD1, the second side SD2, the third side SD3, and the fourth side SD4 are simply referred to as "side SD1", "side SD2", "side SD3", and "side SD4", as appropriate. The side SD2 is a side opposing the side SD1. For example, when a direction from the side SD1 toward the side SD2 is assumed to be a first direction DR1, the side SD2 is a side that is positioned on the first direction DR1 side of the side SD1 and opposes the side SD1. The side SD4 is a side that opposes the side SD3. For example, when a direction from the side SD3 toward the side SD4 is assumed to be a second direction DR2, the side SD4 is a side that is positioned on the second direction DR2 side of the side SD3 and opposes the side SD3. In addition, the sides SD3 and SD4 are sides in a direction orthogonal to the sides SD1 and SD2. Note that, in FIG. 12, the direction opposite to the first direction DR1 is assumed to be a third direction DR3, and the direction opposite to the second direction DR2 is assumed to be a fourth direction DR4. In addition, for ease of description, the first direction DR1, the second direction DR2, the third direction DR3, and the fourth direction DR4 are simply referred to as "direction DR1", "direction DR2", "direction DR3", and "direction DR4" as appropriate.

As shown in FIG. 12, the circuit device 10 has a core circuit region and an I/O region in which an I/O cell is arranged. The circuits of the circuit device 10 are arranged in the core circuit region. Specifically, circuit elements including active elements such as transistors and passive elements such as resistors and capacitors, the circuit elements constituting the respective circuits, and signal lines that connect the circuit elements are arranged in the core circuit region. For example, the reference current circuit 13, the oscillation circuit 52, the PLL circuit 54, the power supply circuit 60, and the like in FIG. 4 are arranged in the region for analog circuits. The processing circuit 20, the bus monitor circuit 30, and the like are arranged in the region for logic circuits. Specifically, logic circuits formed through automatic arrangement routing using gate array or the like. The circuits of the physical layer circuits described with reference to FIG. 10 are arranged in the regions of the first physical layer circuit 11 and the second physical layer circuit 12. For example, the HS driver HSD1 and the like are arranged in the region of the first physical layer circuit 11, and the HS driver HSD2 and the like are arranged in the region of the second physical layer circuit 12.

Also, the first switch circuit 41 is arranged on the direction DR2 side (second direction side) of the first physical layer circuit 11, and the HS driver HSD1 of the first physical layer circuit 11 and the first switch circuit 41 are connected using a signal line LA. The signal line LA corresponds to the signal lines LA1 and LA2 in FIG. 3. In addition, the second switch circuit 42 is arranged on the direction DR2 side of the second physical layer circuit 12, and the HS driver HSD2 of the second physical layer circuit 12 and the second switch circuit 42 are connected using a signal line LB. The signal line LB corresponds to the signal lines LB1 and LB2 in FIG. 3. The first switch circuit 41 and the second switch circuit 42 are then connected using the signal line LC routed along the direction DR1.

Moreover, the terminals TP1, TM1, and TS1 of the port PT1 are arranged in a first I/O region RI1 that extends along the side SD1 of the circuit device 10. The terminals TP2, TM2, and TS2 of the port PT2 are arranged in a second I/O region RI2 that extends along the side SD2 of the circuit device 10. Note that, for ease of description, the first I/O region RI1 and the second I/O region RI2 are simply referred to as "I/O region RI1" and "I/O region RI2" as appropriate. The terminals TP1 and TP2 corresponds to the terminal TP in FIG. 11, the terminals TM1 and TM2 correspond to the terminal TM, and the terminals TS1 and TS2 correspond to the terminal TS. The HS driver HSD1 is arranged on the direction DR1 side (the first direction side) of the terminals TP1, TM1, and TS1. Accordingly, the HS driver HSD1 is arranged in the vicinity of the terminals TP1, TM1, and TS1 such that the HS driver HSD1 is connected to the terminals TP1, TM1, and TS1 on a short path. In addition, the HS driver HSD2 is arranged on the direction DR3 side (third direction side) of the terminals TP2, TM2, and TS2. Accordingly, the HS driver HSD2 is arranged in the vicinity of the terminals TP2, TM2, and TS2 such that the HS driver HSD2 is connected to the terminals TP2, TM2, and TS2 on a short path.

Here, as shown in FIG. 12, a line in the center between the side SD1 and the side SD2 of the circuit device 10 that oppose each other is assumed to be a central line LX, a region between the central line LX and the side SD1 is assumed to be a first region RG1, and a region between the central line LX and the side SD2 is assumed to be a second region RG2. The first region RG1 and the second region RG2 are regions of a circuit element formation surface of the circuit device 10 when viewed in planar view. The central line LX is a line parallel to the side SD1 and the side SD2, for example, and is a centerline between the side SD1 and the side SD2, for example. The central line LX is a virtual demarcation line. The first region RG1 is a region on the direction DR3 side (third direction side) of the central line LX, and the second region RG2 is a region on the direction DR1 side of the central line LX. Note that the central line LX is a virtual line equidistant from the side SD1 and the side SD2, but refers to a concept that includes a virtual line whose distances from the side SD1 and the side SD2 are not exactly the same in a range in which an issue of the present invention can be solved.

In addition, in FIG. 12, the HS driver HSD1 of the first physical layer circuit 11 and the first switch circuit 41 are arranged in the first region RG1. The terminals TP1, TM1, and TS1 of the port PT1 are also arranged in the first region RG1. In addition, the HS driver HSD2 of the second physical layer circuit 12 and the second switch circuit 42 are arranged in the second region RG2. The terminals TP2, TM2, and TS2 of the port PT2 are also arranged in the second region RG2. Specifically, in FIG. 12, the first physical layer circuit 11 and the second physical layer circuit 12 are arranged symmetrically relative to the central line LX. The HS driver HSD1 and the HS driver HSD2 are also arranged symmetrically relative to the central line LX, for example. The first switch circuit 41 and the second switch circuit 42 are also arranged symmetrically relative to the central line LX, for example. For example, the circuits are arranged so as to ensure a circuit pattern in which the circuits are symmetrical relative to the central line LX. In addition, the terminals TP1, TM1, and TS1 and the terminals TP2, TM2, and TS2 are also arranged symmetrically relative to the central line LX. Note that, in the present invention, symmetrical arrangement means not only arrangement at geometrically symmetric positions, but also arrangement at positions that are deviated from exact geometric target positions in a range in which an issue of the present invention can be solved. The same applies to the following description.

As described above, in this embodiment, from among the first region RG1 and the second region RG2 demarcated by the central line LX, the first physical layer circuit 11 and the first switch circuit 41 are arranged in the first region RG1, and the second physical layer circuit 12 and the second switch circuit 42 are arranged in the second region RG2. According to this configuration, the first physical layer circuit 11 and the first switch circuit 41 are arranged in the same first region RG1, and thus the first switch circuit 41 can be arranged in the vicinity of the first physical layer circuit 11. Accordingly, the first physical layer circuit 11 and the first switch circuit 41 can be connected on a short path using the signal line LA corresponding to the signal lines LA1 and LA2 in FIG. 3. According to this configuration, it is possible to shorten the length of the signal line LA, and the wiring capacitance of the signal line LA is reduced, and thus it is possible to minimize an increase in the input capacitance of the first physical layer circuit 11 due to the wiring capacitance of the signal line LA being added. Accordingly, it is possible to improve the signal characteristics during HS communication in the first physical layer circuit 11. In addition, in this embodiment, the second physical layer circuit 12 and the second switch circuit 42 are arranged in the same second region RG2, and thus the second switch circuit 42 can be arranged in the vicinity of the second physical layer circuit 12. Accordingly, the second physical layer circuit 12 and the second switch circuit 42 can be connected on a short path using the signal line LB corresponding to the signal lines LB1 and LB2 in FIG. 3. According to this configuration, it is possible to shorten the length of the signal line LB, and the wiring capacitance of the signal line LB is reduced, and thus it is possible to minimize an increase in the input capacitance of the second physical layer circuit 12 due to the wiring capacitance of the signal line LB being added. As a result, it is possible to improve the signal characteristics during HS communication in the second physical layer circuit 12.

Moreover, in FIG. 12, the first switch circuit 41 is arranged on the direction DR2 side (second direction side) of the HS driver HSD1, and the second switch circuit 42 is arranged on the direction DR2 side of the HS driver HSD2. For example, the signal line LA is routed on the direction DR2 side of the HS driver HSD1. For example, the signal line LA is routed along the direction DR2, and this signal line LA is connected to the first switch circuit 41. In addition, the signal line LB is routed on the direction DR2 side of the HS driver HSD2. For example, the signal line LB is routed along the direction DR2, and this signal line LB is connected to the second switch circuit 42. The first switch circuit 41 and the second switch circuit 42 are then connected using the signal line LC that runs along the direction DR1.

As described above, in FIG. 12, the first switch circuit 41 is arranged on the direction DR2 side of the HS driver HSD1, and the second switch circuit 42 is arranged on the direction DR2 side of the HS driver HSD2. In addition, the signal line LC that connects the first switch circuit 41 and the second switch circuit 42 is routed along the direction DR1 orthogonal to the direction DR2. According to this configuration, it is possible to shorten the wiring length of the signal line LA that connects the port PT1 and the first switch circuit 41 and the wiring length of the signal line LB that connects the port PT2 and the second switch circuit 42. Accordingly, the wiring capacitances of the signal lines LA and LB can be reduced, and it is possible to minimize an increase in capacitances, which is due to these wiring capacitances, that are added to the HS drivers HSD1 and HSD2. Therefore, it is possible to improve the signal characteristics of HS communication that is performed by the HS drivers HSD1 and HSD2. For example, as is clear from FIG. 12, by increasing the wiring length of the signal line LC that connects the first switch circuit 41 and the second switch circuit 42, it is possible to have the first switch circuit 41 close to the HS driver HSD1, and have the second switch circuit 42 close to the HS driver HSD2. Accordingly, it is possible to reduce the wiring lengths of the signal line LA and LB, and it is possible to improve the signal characteristics during HS communication. In this case, due to an increase in the wiring length of the signal line LC, a wiring capacitance that is the parasitic capacitance of the signal line LC increases. However, as described above, during HS communication, the signal line LC and the ports PT1 and PT2 of the USB are electrically disconnected by the first and second switch circuits 41 and 42. Therefore, there is the advantage that the signal characteristics during HS communication is not degraded even if the wiring capacitance of the signal line LC increases.

Figure 13:
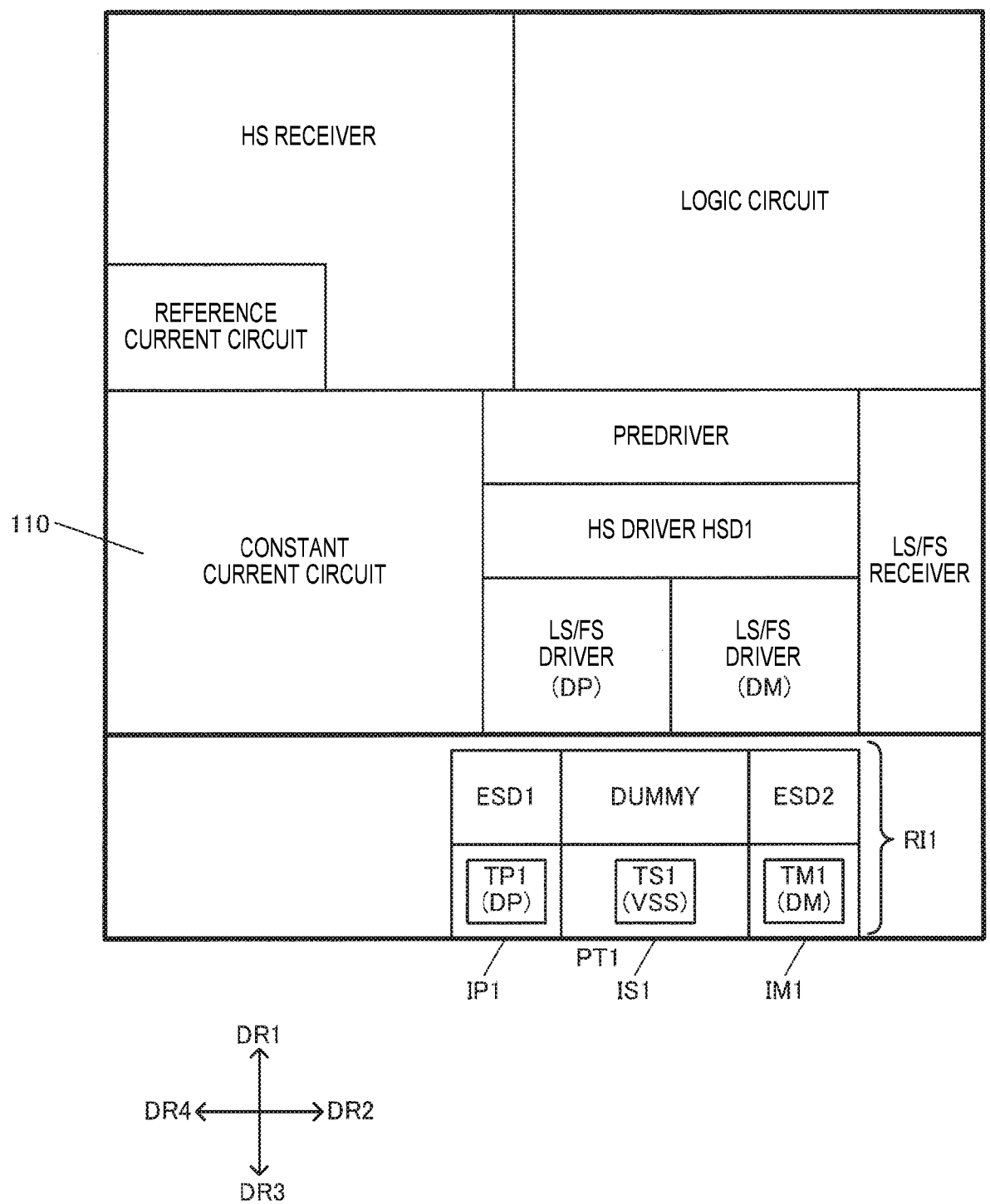
FIG. 13 shows a layout arrangement example of the physical layer circuit.

FIG. 13 shows a detailed layout arrangement example of the first physical layer circuit 11. Note that the layout arrangement of the second physical layer circuit 12 is similar to that of the first physical layer circuit 11, and thus a detailed description is omitted. As shown in FIG. 13, a first I/O cell IP1 that has the terminal TP1 and a second I/O cell IM1 that has the terminal TM1 are arranged in the I/O region RI1. A third I/O cell IS1 that has the terminal TS1 is also arranged. Note that, for ease of description, the first I/O cell IP1, the second I/O cell IM1, and the third I/O cell IS1 are simply referred to as "I/O cell IP1", "I/O cell IM1", and "I/O cell IS1" as appropriate. An electrostatic protective element ESD is arranged in the I/O cells IP1 and IM1. A dummy electrostatic protective element is arranged in the I/O cell IS1.

In FIG. 13, the circuits that constitute the first physical layer circuit 11 are arranged on the direction DR1 side of the terminals TP1, TS1, and TM1. For example, LS/FS drivers are arranged on the direction DR1 side of the terminals TP1, TS1, and TM1, and the HS driver HSD1 is arranged on the direction DR1 side of the LS/FS drivers. The switch elements SW1, SW2, and SW3 in FIG. 11 are arranged in the region of this HS driver HSD1. In addition, a predriver that drives these drivers is arranged on the direction DR1 side of the HS driver. In addition, a logic circuit for the first physical layer circuit 11 is arranged on the direction DR1 side of the predriver, and an HS receiver and a reference current circuit are arranged on the direction DR4 side (fourth direction side) of the logic circuit. In addition, the LS/FS receiver is arranged on the direction DR2 side of the HS driver HSD1, and the constant current circuit 110 described with reference to FIG. 11 is arranged on the direction DR4 side of the HS driver. According to the layout arrangement in FIG. 13, the HS driver HSD1 and the LS/FS drivers are arranged in the vicinity of the terminals TP1, TM1, and TS1. Therefore, it is possible to connect the terminals TP1, TM1, and TS1 and these circuits on a short path, and reduce parasitic resistances and parasitic capacitances of connection signal lines, and thus it is possible to improve the signal characteristics and communication properties in communication modes.

Figure 14:
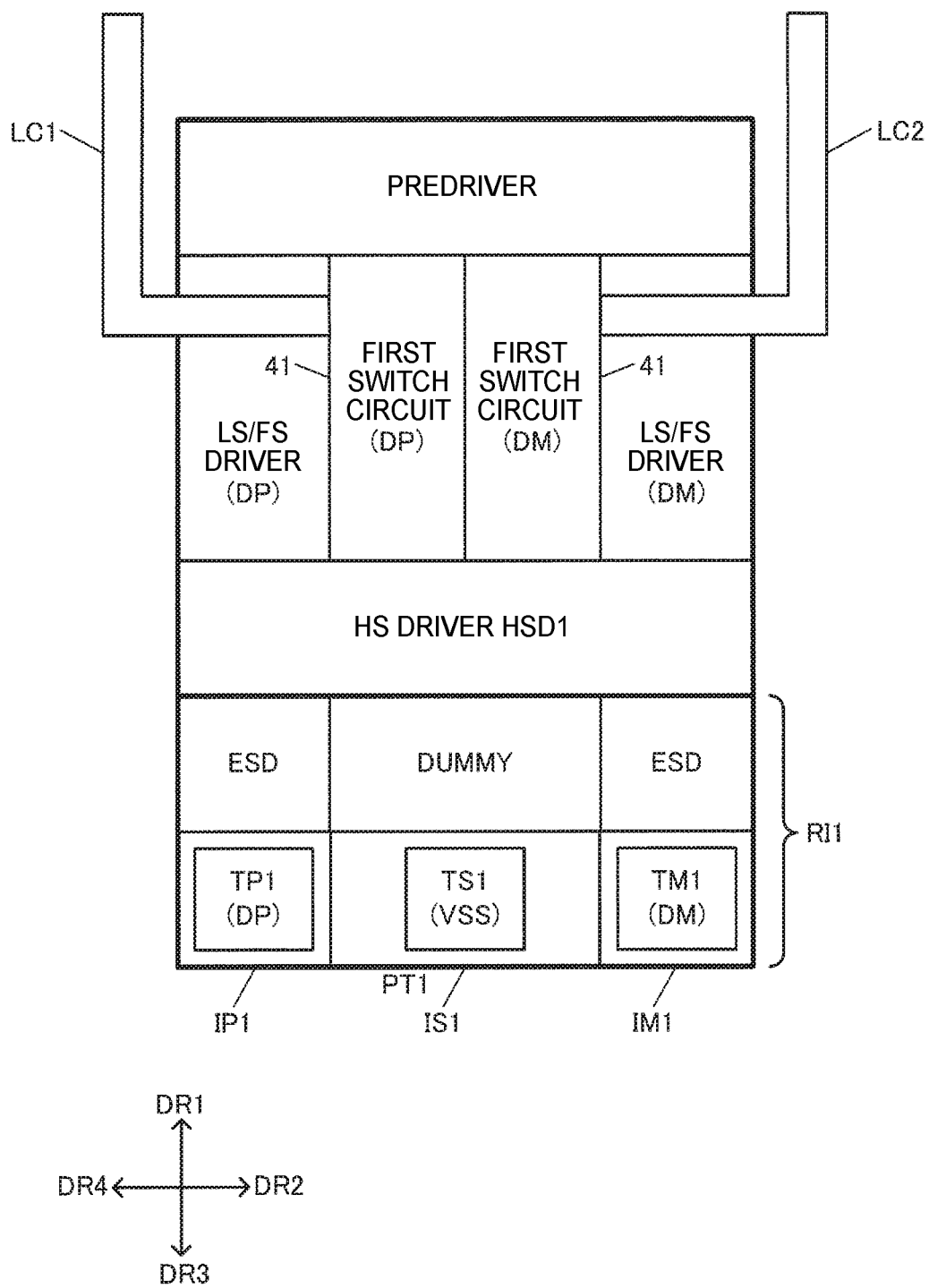
FIG. 14 shows a first arrangement example of a first switch circuit.
Figure 15:
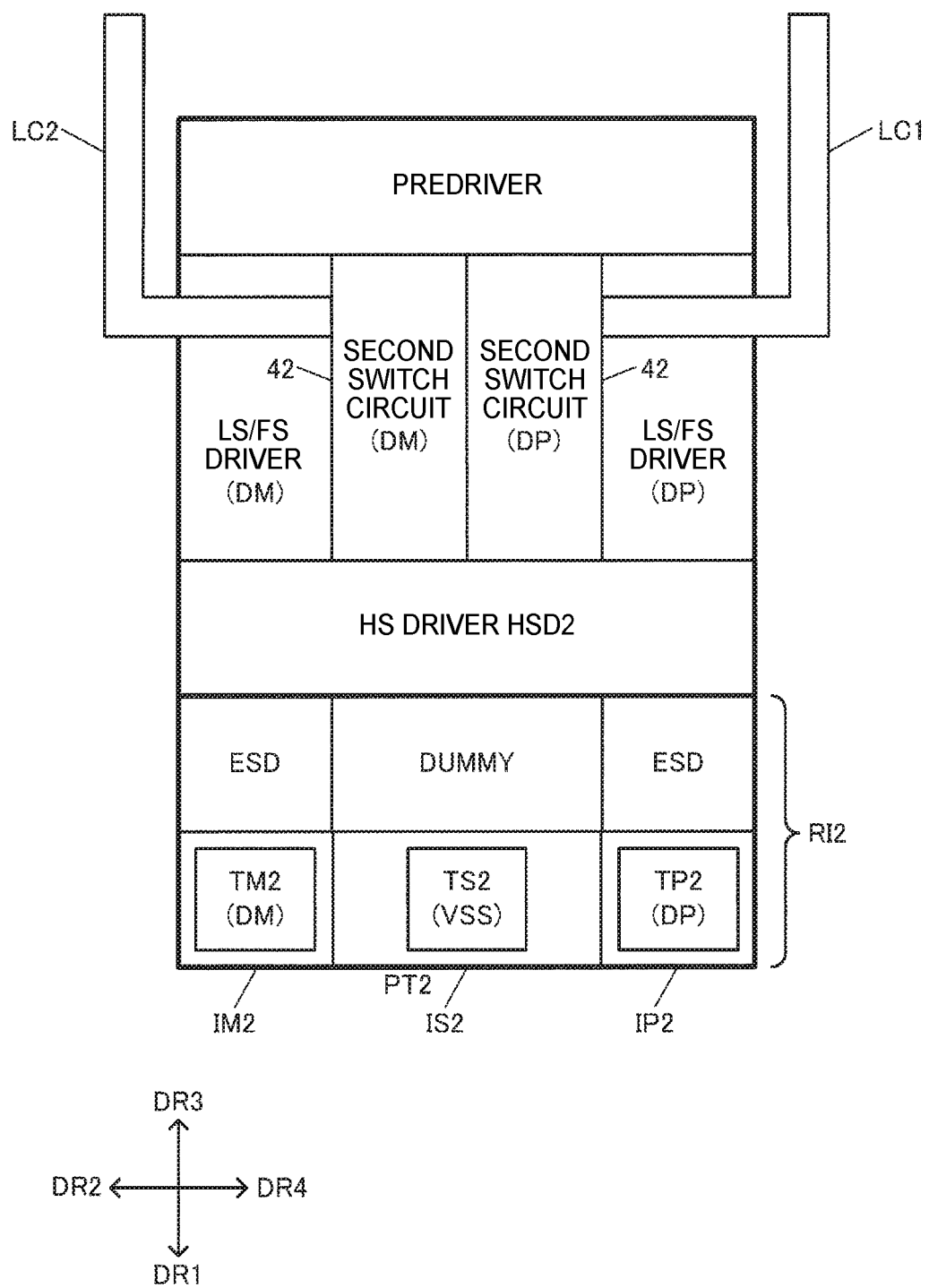
FIG. 15 shows a first arrangement example of a second switch circuit.

Note that the layout arrangement of the first switch circuit 41 and the second switch circuit 42 in this embodiment is not limited to the layout arrangement in FIG. 12, and various deformations can be carried out. FIGS. 14 and 15 show a first arrangement example of the first switch circuit 41 and the second switch circuit 42.

As shown in FIGS. 3 and 12, the circuit device 10 of this embodiment includes the terminals TP1 and TM1 to which the DP signal line LP1 and the DM signal line LM1 of the first bus BS1 are connected. The circuit device 10 also includes the terminals TP2 and TM2 to which the DP signal line LP2 and the DM signal line LM2 of the second bus BS2 are connected. In addition, in the first arrangement example of this embodiment, as shown in FIG. 14, the first switch circuit 41 is arranged on the direction DR1 side of the terminal TP1 and the terminal TM1 (first terminal and second terminal). In addition, as shown in FIG. 15, the second switch circuit 42 is arranged on the direction DR3 side of the terminal TP2 and the terminal TM2 (third terminal and fourth terminal). For example, in FIG. 14, the HS driver HSD1 is arranged on the direction DR1 side of the I/O region RI1 on which the I/O cells IP1, IS1, and IM1 are arranged, and the first switch circuit 41 is arranged on the direction DR1 side of the HS driver HSD1. In the arrangement region of the first switch circuit 41, the first switch element for signals DP is arranged in the arrangement region of the direction DR4 side, and the signal line LC1 is connected to this first switch element. In addition, the second switch element for signals DM is arranged in the arrangement region on the direction DR2 side, and the signal line LC2 is connected to this second switch element. Also, the LS/FS driver for signals DP is arranged on the direction DR4 side of the first switch circuit 41, and the LS/FS driver for signals DM is arranged on the direction DR2 side. In addition, the predriver is arranged on the direction DR1 side of the first switch circuit 41. Here, in the arrangement region of the LS/FS drivers, registers for HS termination (Rs1 and Rs2 in FIG. 10) are arranged. The same applies to second and third arrangement examples to be described later.

On the other hand, in FIG. 15, the HS driver HSD2 is arranged on the direction DR3 side of the I/O region RI2 in which the I/O cells IP2, IS2, and IM2 are arranged, and the second switch circuit 42 is arranged on the direction DR3 side of the HS driver HSD2. In the arrangement region of the second switch circuit 42, the third switch element for signals DP is arranged in the arrangement region on the direction DR4 side, and the signal line LC1 is connected to this third switch element. In addition, in the arrangement region on the direction DR2 side, the fourth switch element for signals DM is arranged, and the signal line LC2 is connected to this fourth switch element. Moreover, the LS/FS driver for signals DP is arranged on the direction DR4 side of the second switch circuit 42, and the LS/FS driver for signals DM is arranged on the direction DR2 side. In addition, the predriver is arranged on the direction DR3 side of the second switch circuit 42.

According to the first arrangement example in FIGS. 14 and 15, compared with the arrangement example in FIGS. 12 and 13, the first switch circuit 41 and the terminals TP1 and TM1 can be connected on a short path, and the second switch circuit 42 and the terminals TP2 and TM2 can be connected on a short path. In other words, in the first arrangement example in FIGS. 14 and 15, the wiring lengths of the signal lines LA1, LA2, LB1, and LB2 in FIG. 3 can be made shorter compared with those in the arrangement example in FIGS. 12 and 13. Accordingly, it is possible to reduce the wiring capacitances of the signal lines LA1, LA2, LB1, and LB2, and the signal characteristics during HS communication can be further improved. In addition, in FIGS. 14 and 15, the distance between the HS driver HSD1 and the terminals TP1 and TM1, and the distance between the HS driver HSD2 and the terminals TP2 and TM2 are shorter than those in the arrangement example in FIG. 13. Therefore, it is possible to lower a resistance value of parasitic resistance, which is series resistance, for on-resistance of the HS switch elements SW1 and SW2 described with reference to FIG. 11, and reduce parasitic capacitance, and thus the signal characteristics during HS communication can be improved.

Figure 16:
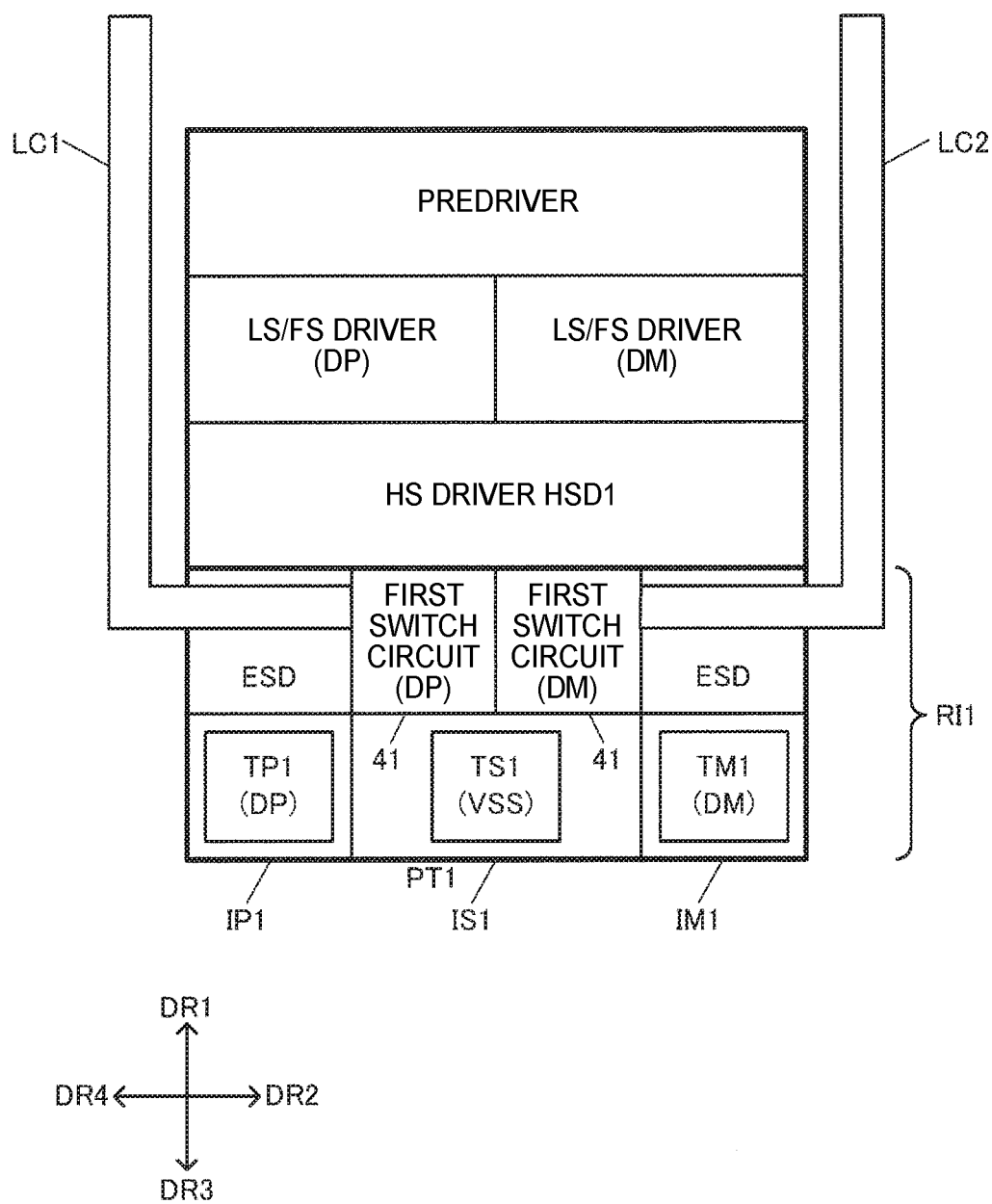
FIG. 16 shows a second arrangement example of the first switch circuit.
Figure 17:
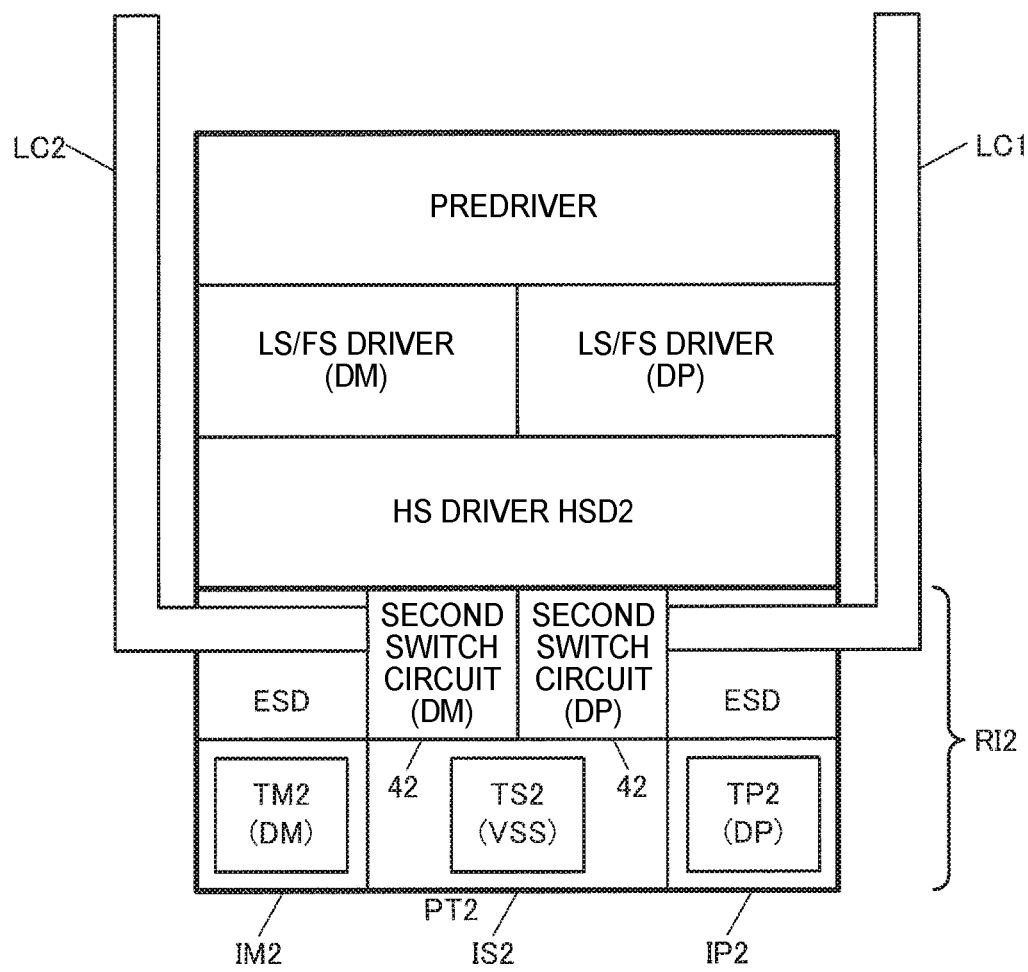
FIG. 17 shows a second arrangement example of the second switch circuit.

FIGS. 16 and 17 show the second arrangement example of first switch circuits 41 and second switch circuits 42. In the second arrangement example, as shown in FIG. 16, the first switch circuits 41 are arranged in the I/O region RI1 (first I/O region) in which the terminal TP1 and the terminal TM1 (first terminal and second terminal) are arranged. In addition, as shown in FIG. 17, the second switch circuits 42 are arranged in the I/O region RI2 (second I/O region) in which the terminal TP2 and the terminal TM2 (third terminal and fourth terminal) are arranged.

Specifically, the I/O cell IP1 (first I/O cell) that has the terminal TP1 and the I/O cell IM1 (second I/O cell) that has the terminal TM1 are arranged in in the I/O region RI1 in FIG. 16. The first switch circuits 41 are arranged between the I/O cell IP1 and the I/O cell IM1. In addition, an I/O cell IP2 (third I/O cell) that has the terminal TP2 and an I/O cell IM2 (fourth I/O cell) that has the terminal TM2 are arranged in the I/O region RI2 in FIG. 17. The second switch circuits 42 are then arranged between the I/O cell IP2 and the I/O cell IM2. Note that the I/O cell IP1, the I/O cell IM1, the I/O cell IP2, and the I/O cell IM2 shown in FIGS. 16 and 17 are cells that respectively include ESD regions.

Note that, in FIG. 16, the HS driver HSD1 is arranged on the direction DR1 side of the I/O region RI1, the LS/FS drivers are arranged on the direction DR1 side of the HS driver HSD1, and the predriver is arranged on the direction DR1 side of the LS/FS drivers. In addition, in FIG. 17, the HS driver HSD2 is arranged on the direction DR3 side of the I/O region RI2, the LS/FS drivers are arranged on the direction DR3 side of the HS driver HSD2, and the predriver is arranged on the direction DR3 side of the LS/FS drivers.

In the second arrangement example in FIGS. 16 and 17, the first switch circuits 41 are arranged in the I/O region RI1, and the second switch circuits 42 are arranged in the I/O region RI2. According to this second arrangement example, compared with the arrangement example in FIGS. 12 and 13 and the first arrangement example in FIGS. 14 and 15, the first switch circuits 41 and the terminals TP1 and TM1 can be connected on a short path. In addition, the second switch circuits 42 and the terminals TP2 and TM2 can also be connected on a short path. Therefore, it is possible to further shorten the wiring lengths of the signal lines LA1, LA2, LB1, and LB2 in FIG. 3, and further reduce the wiring capacitances of these signal lines, and thus the signal characteristics during HS communication can be further improved.

In addition, in the arrangement example in FIGS. 16 and 17, the first switch circuits 41 are arranged between the I/O cell IP1 and the I/O cell IM1, and the second switch circuits 42 are arranged between the I/O cell IP2 and the I/O cell IM2. According to this configuration, the first switch circuits 41 and the terminals TP1 and TM1 can be connected, and the second switch circuits 42 and the terminals TP2 and TM2 can be connected, using signal lines whose wiring lengths are very short. In addition, layout arrangement in which the first switch circuit 41 and the second switch circuit 42 are highly symmetrical is also possible. For example, in FIG. 16, it is possible to symmetrically arrange the first switch circuits 41 and the terminals TP1 and TM1 relative to a line in the direction DR1 that passes through the center of the terminal TS1. In addition, in FIG. 17, it is possible to symmetrically arrange the second switch circuits 42 and the terminals TP2 and TM2 relative to a line in the direction DR1 that passes through the center of the terminal TS2. Due to such a highly symmetrical arrangement, it is possible to eliminate an unbalanced portion on the signal DP side and the signal DM side, and the signal characteristics during HS communication can be further improved. In addition, according to the second arrangement example, as shown in FIG. 16, the first switch circuits 41 can be arranged by effectively using free space on the direction DR1 side of the terminal TS1 of the I/O cell 1S1. In addition, as shown in FIG. 17, by effectively using free space on the direction DR3 side of the terminal TS2 of an I/O cell IS2, the second switch circuits 42 can be arranged. Specifically, in a region in which a dummy electrostatic protective element is arranged, the first switch circuit 41 and the second switch circuit 42 can be arranged. Therefore, efficient layout arrangement in which free space is effectively used is possible.

Figure 18:
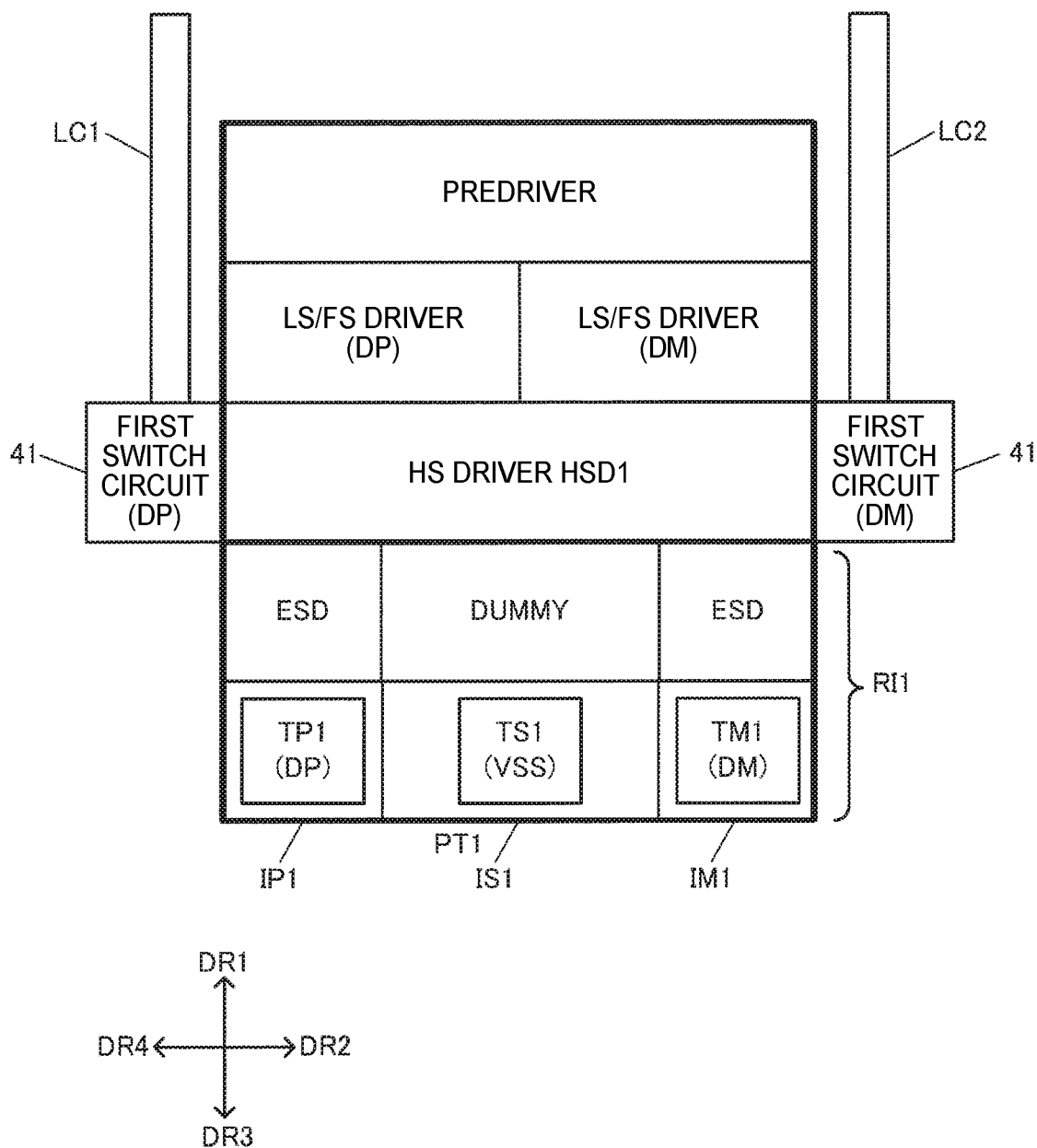
FIG. 18 shows a third arrangement example of the first switch circuit.
Figure 19:
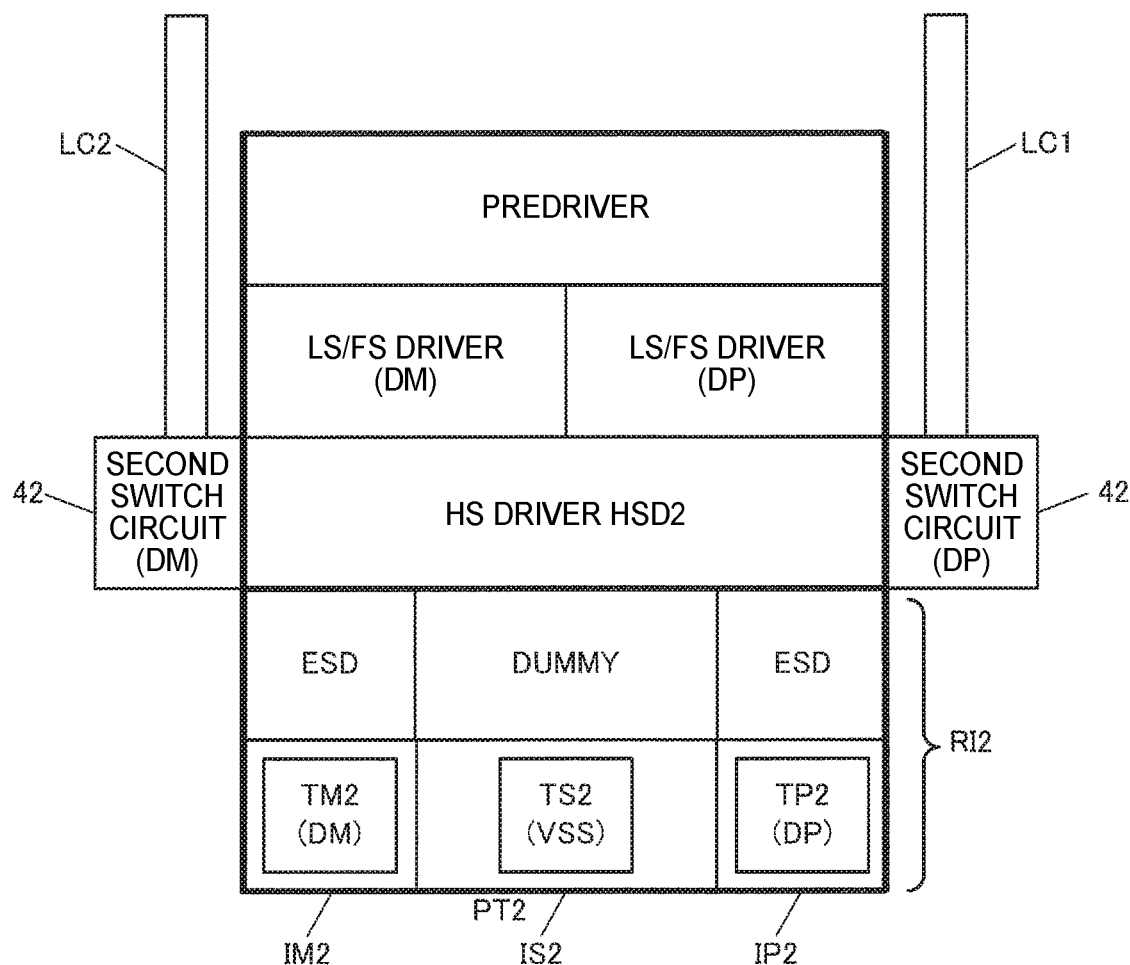
FIG. 19 shows a third arrangement example of the second switch circuit.
Figure 19:
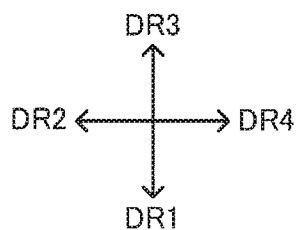

FIGS. 18 and 19 show the third arrangement example of first switch circuits 41 and second switch circuits 42. In FIG. 18, the first switch circuits 41 arranged in a region between the I/O cells IP1 and IM1 in FIG. 16 are arranged in free spaces on two sides of the HS driver HSD1. For example, the first switch element for signals DP in the first switch circuit 41 is arranged on the direction DR4 side of the HS driver HSD1, and the second switch element for signals DM is arranged on the direction DR2 side of the HS driver HSD1. In addition, in FIG. 19, the second switch circuits 42 arranged in a region between the I/O cells IP2 and IM2 in FIG. 17 are arranged in free spaces on two sides of the HS driver HSD2. For example, the third switch element for signals DP in the second switch circuit 42 is arranged on the direction DR4 side of the HS driver HSD2, and the fourth switch element for signals DM is arranged on the direction DR2 side of the HS driver HSD2. According to this third arrangement example, the first switch circuits 41 and the second switch circuits 42 can be arranged by using free space in the periphery of a physical layer circuit such as an HS driver, and thus efficient layout arrangement in which free space is effectively used is possible.

Figure 20:
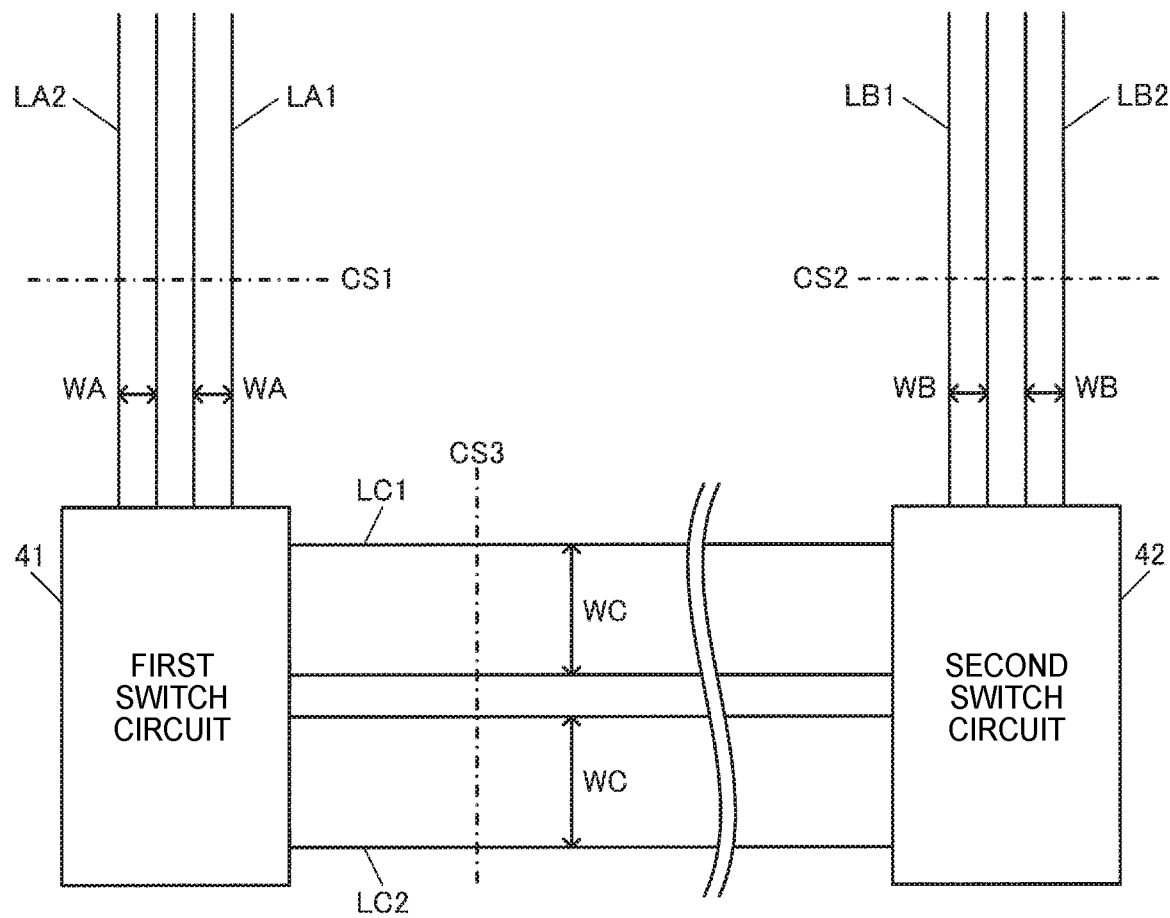
FIG. 20 shows a wiring example of signal lines.

FIG. 20 shows a wiring example of signal lines in this embodiment. The first switch circuit 41 and the second switch circuit 42 are connected using the signal lines LC1 and LC2 that are routed along the direction DR1. In addition, the first switch circuit 41 is connected to the first bus BS1 using the signal lines LA1 and LA2 that are routed along the direction DR2. The second switch circuit 42 is connected to the second bus BS2 using the signal lines LB1 and LB2 that are routed along the direction DR2. Specifically, the first switch circuit 41 is connected from the signal lines LA1 and LA2 to the first bus BS1 via the terminals TP1 and TM1. The second switch circuit 42 is connected from the signal lines LB1 and LB2 to the second bus BS2 via the terminals TP2 and TM2.

In addition, in this embodiment, as shown in FIG. 20, a wiring width WC of the signal lines LC1 and LC2 that connect the first switch circuit 41 and the second switch circuit 42 is larger than a wiring width WA of the signal lines LA1 and LA2 that connect the first bus BS1 and the first switch circuit 41. In addition, the wiring width WC of the signal lines LC1 and LC2 is larger than a wiring width WB of the signal lines LB1 and LB2 that connect the second bus BS2 and the second switch circuit 42. Here, the wiring widths WA, WB, and WC are wiring widths of the circuit device 10 in planar view in a direction orthogonal to the substrate. The wiring width WC of the signal lines LC1 and LC2 is 100 μm or more, for example. For example, the wiring width WC is set to be sufficiently large such that the wiring resistance of the signal lines LC1 and LC2 is lower than the on-resistance of the first and second switch circuits 41 and 42. As an example, the on-resistance of the first and second switch circuits 41 and 42 is about 5 to 10Ω, for example, and the wiring resistance of the signal lines LC1 and LC2 is about 1 to 3Ω, for example. It is sufficient that the wiring width WA of the signal lines LA1 and LA2 and the wiring width WB of the signal lines LB1 and LB2 are determined as appropriate in consideration of the balance between the wiring capacitance and wiring resistance.

By setting the wiring width WA of the signal lines LA1 and LA2 and the wiring width WB of the signal lines LB1 and LB2 to be smaller than the wiring width WC of the signal lines LC1 and LC2 in this manner, the wiring capacitances of the signal lines LA1, LA2, LB1, and LB2 can be made small, and it is possible to suppress increase in the input capacitances of the first and second physical layer circuits 11 and 12 due to this wiring capacitance. Accordingly, the signal characteristics during HS communication can be improved. On the other hand, during HS communication, the signal lines LC1 and LC2 are electrically shut off from the first bus BS1 and the second bus BS2 by the first and second switch circuits 41 and 42 that have been switched off. Therefore, even if the wiring width WC of the signal lines LC1 and LC2 is increased, and the wiring capacitance increases, the signal characteristics during HS communication is not negatively affected. Also, by increasing the wiring width WC of the signal lines LC1 and LC2, and thus lowering the wiring resistance, it is possible to suppress voltage change of a chirp signal during a chirp operation to be described later as much as possible, and the like.

Figure 21:
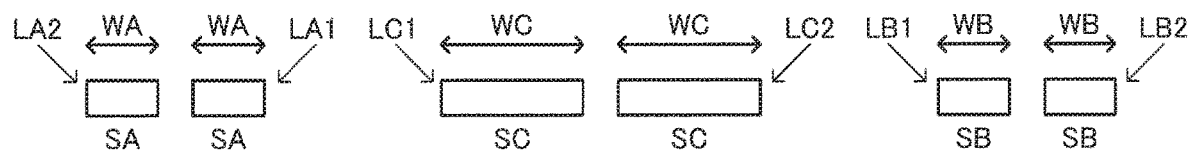
FIG. 21 shows a transverse cross-sectional view of the signal lines.

In addition, in this embodiment, as shown in FIG. 21, a cross-section area SC in a transverse cross section of the signal lines LC1 and LC2 that connect the first switch circuit 41 and the second switch circuit 42 is larger than a cross-section area SA in a transverse cross section of the signal lines LA1 and LA2 that connect the first bus BS1 and the first switch circuit 41. In addition, the cross-section area SC of the signal lines LC1 and LC2 is larger than a cross-section area SB in a transverse cross section of the signal lines LB1 and LB2 that connect the second bus BS2 and the second switch circuit 42. Here, the transverse cross section of the signal lines LA1 and LA2 in FIG. 21 is a cross section cut along a transverse crossline CS1 in FIG. 20. Similarly, the cross section of the signal lines LB1 and LB2 is a cross section cut along a transverse crossline CS2, and the transverse cross section of the signal lines LC1 and LC2 is a cross section cut along a transverse crossline CS3. A transverse cross section is a cross section in a direction orthogonal to a longitudinal direction that is a direction in which a signal line extends.

By increasing the cross-section area SC of the signal lines LC1 and LC2 in this manner, it is possible to reduce the wiring resistance of the signal lines LC1 and LC2, and it is possible to improve the signal characteristics during communication in the first period T1 in which the first and second switch circuits 41 and 42 are switched on. For example, it is possible to keep voltage change of a chirp signal in the first period T1 as low as possible.

Figure 22:
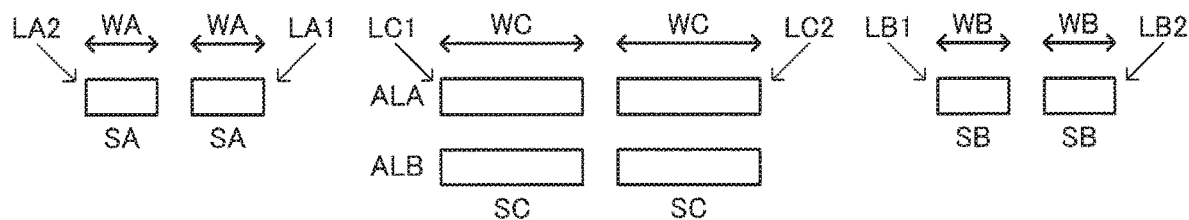
FIG. 22 shows a transverse cross-sectional view of the signal lines.

In addition, in this embodiment, as shown in FIG. 22, the signal lines LC1 and LC2 that connect the first switch circuit 41 and the second switch circuit 42 include a first metal wiring layer ALA and a second metal wiring layer ALB provided below the first metal wiring layer ALA. In other words, the signal lines LC1 and LC2 are routed as a plurality of (two layers or more) metal routing layers. The signal lines LA1, LA2, LB1, and LB2 may also be routed as a plurality of (two layers or more) metal routing layers. The first metal wiring layer ALA is a thick metal wiring layer that is called a "pad metal layer", as an example. By using the pad metal layer that is thick in a direction orthogonal to the substrate, it is possible to increase the cross-section area SC of the signal lines LC1 and LC2, and it is possible to further reduce the wiring resistance.

Figure 23:
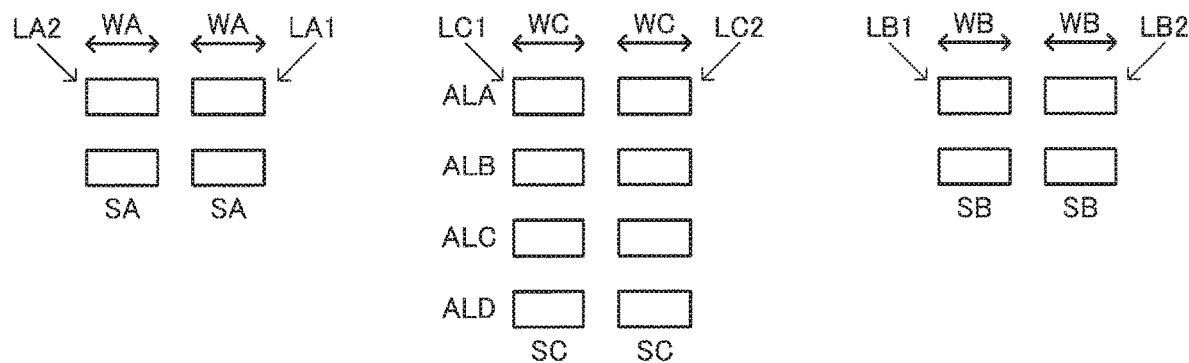
FIG. 23 shows a transverse cross-sectional view of the signal lines.

In addition, in FIG. 23, the wiring width WC of the signal lines LC1 and LC2, the wiring width WA of the signal lines LA1 and LA2, and the wiring width WB of the signal lines LB1 and LB2 are the same, but the number of metal wiring layers that are used is larger regarding the signal lines LC1 and LC2. By increasing the number of metal wiring layers in this manner, the cross-section area SC of the signal lines LC1 and LC2 is larger than the cross-section area SA of the signal lines LA1 and LA2 and the cross-section area SB of the signal lines LB1 and LB2 even if the wiring widths are the same. As described above, in this embodiment, the cross-section area SC may be increased by increasing the number of metal wiring layers. Note that the cross-section areas SA, SB, and SC of this embodiment represent a total cross-section area of a plurality of metal wiring layers and the like.

5. Detailed Exemplary Operation

Next, a detailed exemplary operation in this embodiment will be described. FIG. 24 is a signal waveform chart showing an USB operation sequence after a cable is attached. In the lower part of FIG. 24, switching on and off of connection on the transfer route TR1 in FIG. 5 by the bus switch circuit 40 and switching on and off of transfer processing on the transfer route TR2 in FIG. 6 by the processing circuit 20 are shown. Note that, for example, the host is the main controller 200, and the device is the peripheral device 260.

After cable attachment (timing t1), as a result of the pull-up resistor Rpu being switched on by the device that detected that the VBUS has changed to H level, the voltage of the signal DP is pulled up, and a shift to an FS mode is performed (t2). Here, switching on/off the register Rpu means switching on/off SW_Rpu in the circuit in FIG. 10, for example. The same applies to the following description. In other words, a shift to FS idle is performed, and if nothing happens for a certain period of time, a shift to a suspend state is performed. Next, the host switches on the FS driver, and starts a reset (t3). A terminating resistor of 45Ω is connected to an output node of the FS driver, and when the FS driver is switched on and an L level is output, the voltage of the pulled-up signal DP falls to the L level, and SE0 that causes the signals DP and DM to change to the L level is output. When SE0 of 2.5 μs or more is detected, the device determines that reset is to be performed, switches on the HS driver, and transmits the device chirp K (t4) for a certain period (1 to 7 ms). When the certain period has elapsed, the device switches off the HS driver, and stops the device chirp K (t5), and this starts chirp idle. During chirp idle, the FS driver of the host is on, and thus both the signals DP and DM change to the L level. When the device chirp K is detected, the host switches on the HS driver, and transmits the host chirp K/J (t6). In FIG. 24, the host chirp K/J before a shift to the HS mode is performed is indicated as the host chirp K/J(1). The device recognizes that the host is compatible with the HS mode by detecting the host chirp K/J, switches off the pull-up resistor Rpu, switches on the FS driver, and switches on HS termination (t7). Accordingly, the amplitude of the signals DP and DM drop from 800 mV to 400 mV, and a shift to the HS mode is performed. In FIG. 24, the host chirp K/J after a shift to the HS mode is performed is indicated as the host chirp K/J(2). During the host chirp K/J(2), the FS drivers of both the host and the device are on, a current from the HS driver of the host flows to terminating resistors of these FS drivers. After that, when the host switches off the HS driver and ends the reset (t8), a shift to HS idle is performed, and the host starts SOF transmission (t9). During HS idle, the FS drivers of both the host and the device are switched on, and buses enter an SE0 state. The host switches on the HS driver periodically in a cycle of 125 μs, and transmits SOF.

Figure 24:
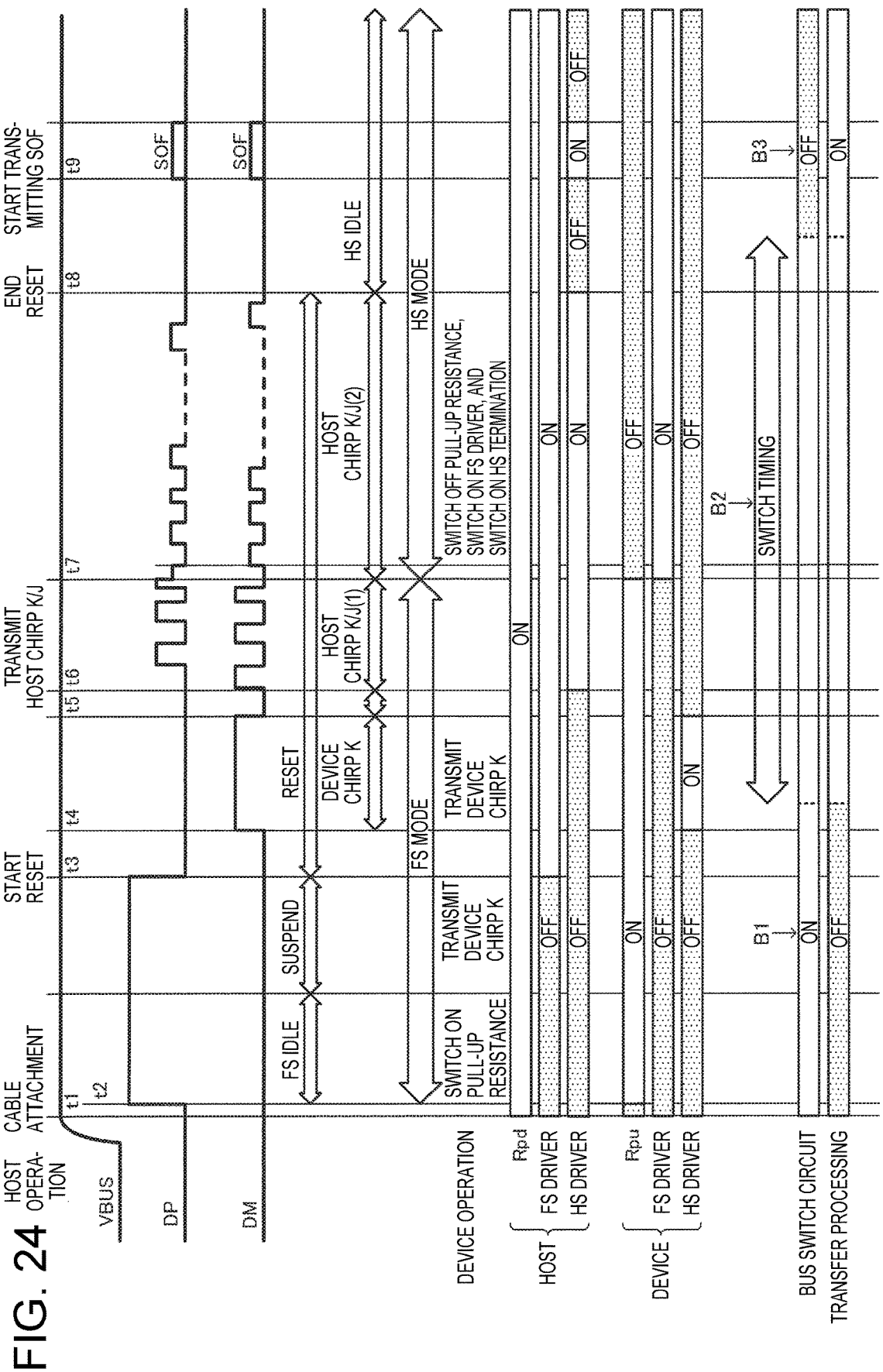
FIG. 24 is a signal waveform diagram illustrating detailed operations of the circuit device.

In this embodiment, after bus reset, in the FS mode, as indicated by a period B1 in FIG. 24, connection between the first bus BS1 and the second bus BS2 is switched on when the bus switch circuit 40 is switched on. Accordingly, signal transfer on the transfer route TR1 in FIG. 5 using signals DP and DM can be performed between the host and the device. At this time, transfer processing on the transfer route TR2 in FIG. 6 is off.

Also, in this embodiment, the switch timing for switching the connection between the first bus BS1 and the second bus BS2 from on to off is set to a timing in the range indicated by a period B2 in FIG. 24. Specifically, the connection between the first bus BS1 and the second bus BS2 is switched from on to off at least after the device chirp K start timing (t4). In other words, a switch is made from the first period TI to second period T2. Alternatively, the connection between the first bus BS1 and the second bus BS2 is switched from on to off at least after a host chirp K/J end timing (t8). For example, at a timing that is at least after the device chirp K start timing (t4) and also before a SOF transmission start timing (t9) for example, the connection between the first bus BS1 and the second bus BS2 is switched from on to off, and transfer processing on the transfer route TR2 is switched from off to on.

As described above, in this embodiment, in the first period T1 indicated by B1, the bus switch circuit 40 is switched on, and therefore the connection between the first bus BS1 and the second bus BS2 is switched on. Signal transfer on the transfer route TR1 is performed between the host and the device. On the other hand, in the second period T2 indicated by B3, the bus switch circuit 40 is switched off, and therefore the connection between the first bus BS1 and second bus BS2 is switched off, and transfer processing performed by the processing circuit 20 is switched on, and therefore packet transfer is performed on the transfer route TR2. Note that the switch timing is a timing within the range indicated by B2, and therefore in FIG. 24, the ranges of on/off switch timing of the bus switch circuit 40 and the on/off switch timing of the transfer processing are indicated by dashed lines.

Also, in this embodiment, at least after the device chirp K start timing (t4), the bus switch circuit 40 switches the connection between the first bus BS1 and the second bus BS2 from on to off, and the processing circuit 20 starts transfer processing on the transfer route TR2. For example, after the device chirp K start timing, the bus switch circuit 40 is switched from on (B1) to off (B3), and the transfer processing performed by the processing circuit 20 is switched from off (B1) to on (B3). Specifically, if the start of device chirp K (t4) is detected, it can be determined that the device is compatible with the HS mode. However, it is very rare that the host is not compatible with the HS mode. For this reason, if the start of device chirp K (t4) is detected, it is possible to switch the bus switch circuit 40 from on to off, and switch HS mode transfer processing performed by the processing circuit 20 from off to on. Accordingly, it is sufficient that the switch timing in the range indicated by B2 is a timing that is at least after the device chirp K start timing (t4).

Alternatively, in consideration also of the possibility that the host is not compatible with the HS mode, a configuration is possible in which if the start of host chirp K/J (t6) is detected, the bus switch circuit 40 is switched from on to off, and HS mode transfer processing performed by the processing circuit 20 is switched from off to on. For example, in this embodiment, a configuration is possible in which at least after the host chirp K/J end timing (t8), the bus switch circuit 40 switches the connection between the first bus BS1 and the second bus BS2 from on to off, and the processing circuit 20 starts transfer processing on the transfer route TR2. According to this configuration, if it is determined that the host and the device are both compatible with the HS mode, and it is determined that the switch to the HS mode is complete, then it is possible to thereafter appropriately start transfer processing performed by the processing circuit 20. In this way, it is sufficient that the switch timing in the range indicated by B2 is at least after the device chirp K start timing. It should be noted that the negative influence of a glitch from switching also needs to be taken into consideration. Accordingly, it is desirable that the switch timing is in a period in which the signals DP and DM have been set to a predetermined voltage level, for example, the L level. Examples include the period from timings t5 to t6 and the period from t8 to t9 in FIG. 24.

As described above, in this embodiment, before the switch timing indicated by B2 in FIG. 24, the bus switch circuit 40 is switched on as indicated by B1, and therefore signals can be exchanged on the USB bus between the host and the device. The bus monitor circuit 30 monitors the exchange of signals on the USB bus. If device chirp K or host chirp K/J is detected for example, it is determined that HS mode transfer is possible, and thus the bus switch circuit 40 is switched from on to off, and transfer processing performed by the processing circuit 20 is switched from off to on. Accordingly, it is possible to appropriately shift to HS mode transfer processing after the exchange of signals between the host and the device.

In addition, in this embodiment, in the second period T2 that is an HS period and is indicated by B3, the first and second switch circuits 41 and 42 are switched off, and the signal line LC (LC1 and LC2) are electrically disconnected. Therefore, it is possible to prevent the wiring capacitance of the signal line LC from negatively affecting HS communication. On the other hand, first, in the first period T1 in which the first and second switch circuits 41 and 42 are switched on, LS and FS signals and signals for handshaking for HS pass through the signal line LC. Here, the LS and FS signals are driven through voltage driving, and thus the wiring resistance of the signal line LC only affects signal delay, and there is no problem.

On the other hand, a series of driving of a chirp signal for a shift from FS to HS is current driving in which a current from an HS driver is used, and communication is performed by the current from the HS driver flowing into a terminating resistor. For example, in the device chirp K in FIG. 24, a current from the HS driver of the device that is connected to the port PT2 passes through the signal line LC of the bus switch circuit 40, and flows into the terminating resistor of the host connected to the port PT1. In addition, in host chirp K/J, a current from the HS driver of the host connected to the port PT1 passes through the signal line LC of the bus switch circuit 40, and flows into the terminating resistor of the device connected to the port PT2. Therefore, if the wiring resistance of the signal line LC increases, a voltage change of a chirp signal occurs.

In this regard, in this embodiment, the signal line LC in the bus switch circuit 40 can be electrically separated using the first and second switch circuits 41 and 42. Therefore, as described with reference to FIGS. 20 to 23, free layout design in which the wiring width of the signal line LC (LC1 and LC2) is increased or the number of metal wiring layers is increased, the cross-section area SC is increased, and the like is possible. Therefore, by performing creative layout design, it is possible to lower the wiring resistance of the signal line LC, and it is possible to keep voltage change of the above-described chirp signal as low as possible.

Figure 25:
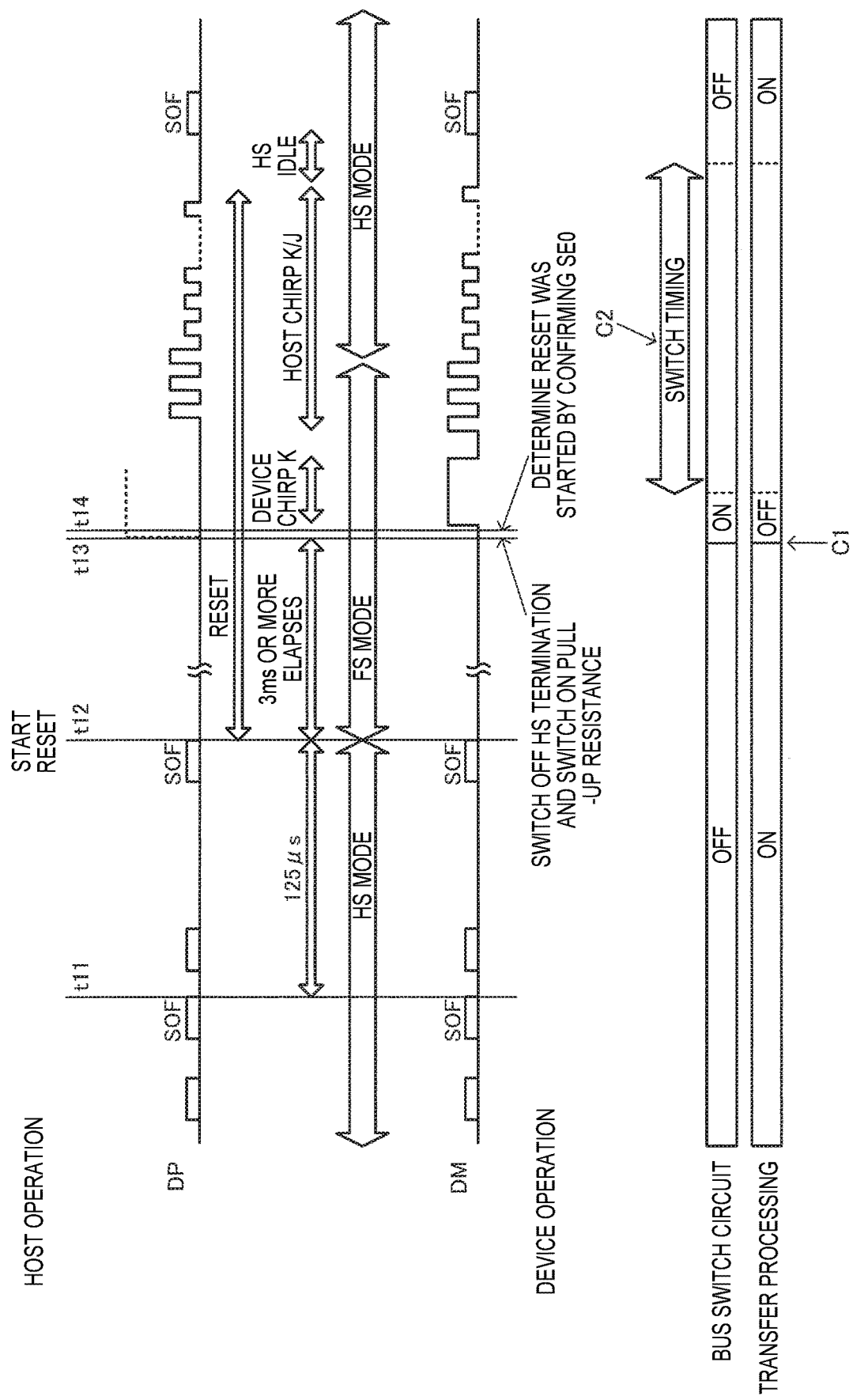
FIG. 25 is a signal waveform diagram illustrating detailed operations of the circuit device.

FIG. 25 is a signal waveform diagram showing an operation sequence when a reset is performed in HS mode transfer. In the HS mode, the host transmits an SOF packet every 125 μs (t11, t12). If the host starts a reset (t12), a shift to the FS mode is performed, and if a state where no packet is on the bus has continued for 3 ms or more, the device switches off HS termination, and switches on the pull-up resistance (t13). On the device, it is confirmed that the bus state is SE0 (t14), and therefore it is determined that a reset was started, and a device chirp K is transmitted. In response to this, the host transmits a host chirp K/J, and a shift from the FS mode to the HS mode is performed.

As indicated by C1 in FIG. 25, in this embodiment, if the host starts a reset, the bus switch circuit 40 is switched from off to on, and transfer processing performed by the processing circuit 20 is switched from on to off. In other words, if a reset is performed by the host, the bus switch circuit 40 switches the connection between the first bus BS1 and the second bus BS2 from off to on, and the processing circuit 20 stops performing transfer processing. According to this configuration, if a reset is performed during HS mode transfer for example, the first bus BS1 and the second bus BS2 become electrically connected, and signal transfer can be performed using the signals DP and DM between the host and the device. Thereafter, at a switch timing in the range indicated by C2 in FIG. 25 for example, the bus switch circuit 40 is switched from on to off, and transfer processing performed by the processing circuit 20 is switched from off to on. Accordingly, it is possible to appropriately shift to HS mode transfer processing after the exchange of signals between the host and the device.

Figure 26:
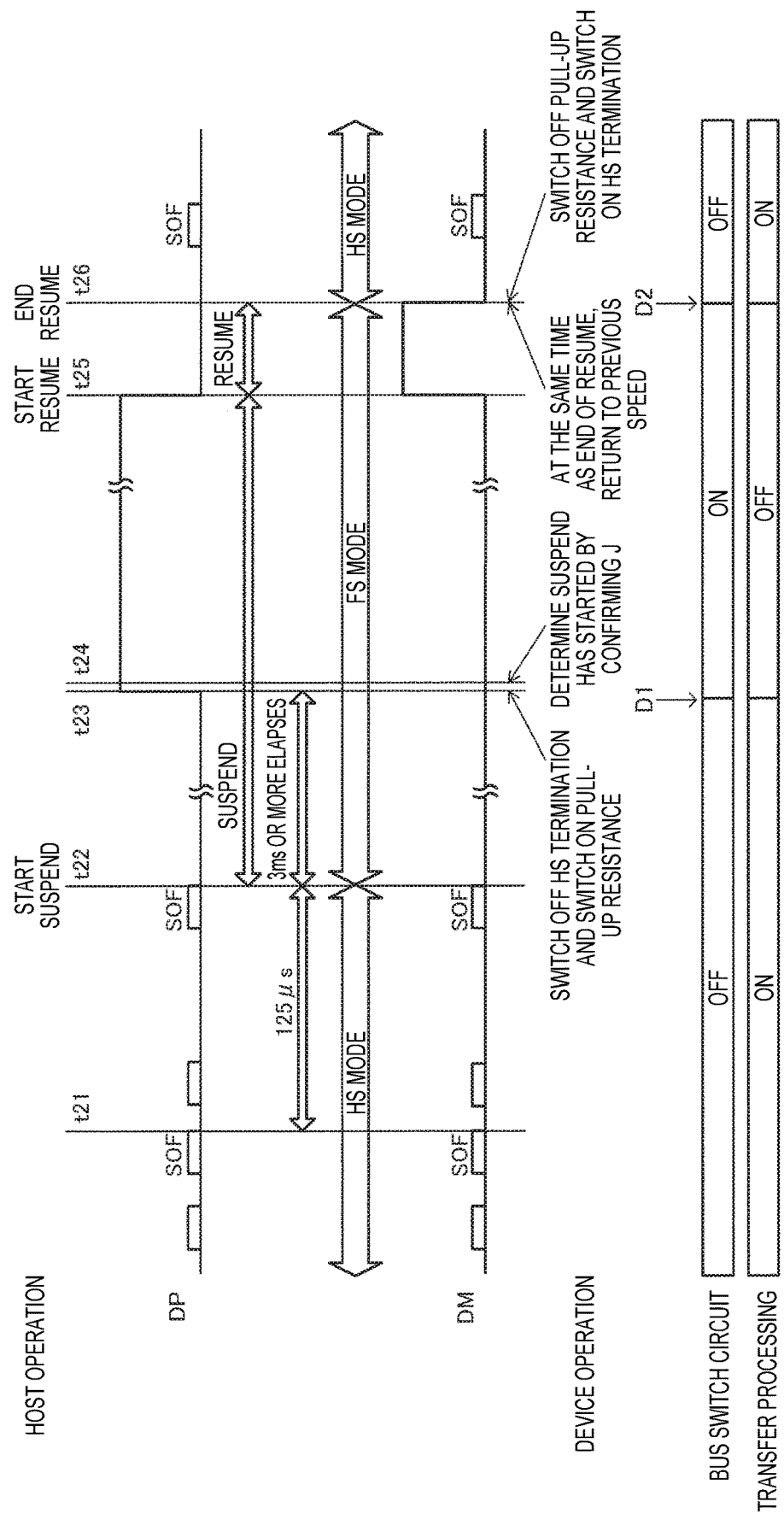
FIG. 26 is a signal waveform diagram illustrating detailed operations of the circuit device.

FIG. 26 is a signal waveform diagram showing an operation sequence in the case of a shift from HS mode transfer to suspend and a shift to resume. If the host starts a suspend (t22), a shift to the FS mode is performed, and if a state where no packet is on the bus has continued for 3 ms or more, the device switches off HS termination, and switches on the pull-up resistance (t23). Then, on the device, it is confirmed that the state of the bus is J (t24), and therefore it is determined that a suspend has started. Then the host starts a resume (t25), and when the resume ends (t26), at the same time as the end of the resume, the device returns to the mode that was realized prior to the suspend. Then the pull-up resistance is switched off, the HS termination is switched on, and the mode returns to the HS mode. As indicated by D1 in FIG. 26, in this embodiment, even if the host starts a suspend, the bus switch circuit 40 is switched from off to on, and transfer processing performed by the processing circuit 20 is switched from on to off. In other words, if a suspend is performed by the host, the bus switch circuit 40 switches the connection between the first bus BS1 and the second bus BS2 from off to on, and the processing circuit 20 stops performing transfer processing. According to this configuration, if a suspend is performed during HS mode transfer for example, the first bus BS1 and the second bus BS2 become electrically connected, and signal transfer can be performed using the signals DP and DM between the host and the device for example. Then, after the suspend, the host performs a resume, and therefore, as indicated by D2 in FIG. 26, the bus switch circuit 40 is switched from on to off, and the transfer processing performed by the processing circuit 20 is switched from off to on. Accordingly, by performing a resume after a suspend, HS mode data transfer can be appropriately resumed. Note that the operation sequence of a shift from suspend to reset is similar to the operation sequence of a shift from suspend to reset after a shift from cable attachment to FS idle.

6. Electronic Device and Cable Harness

Figure 27:
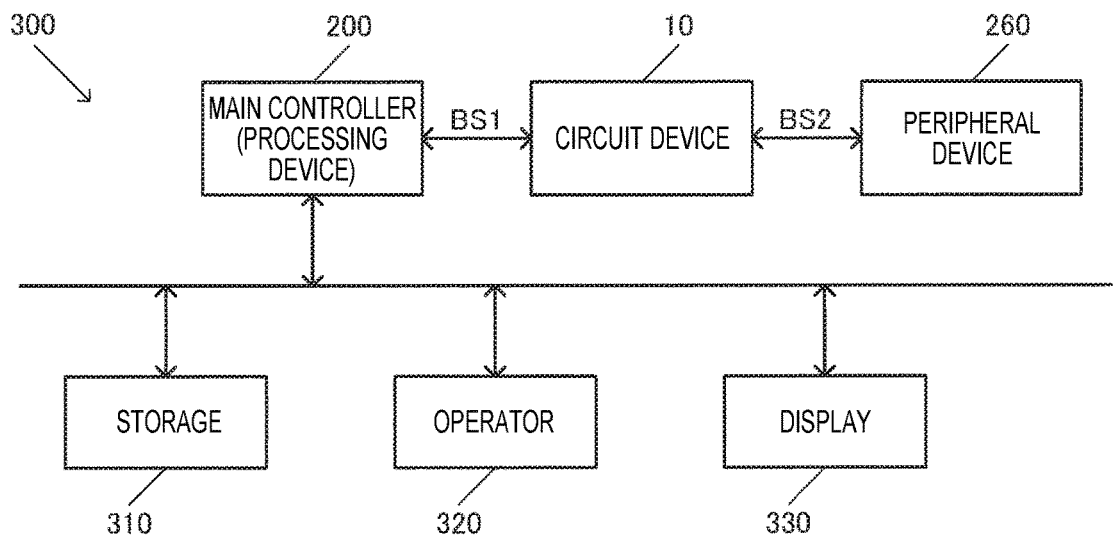
FIG. 27 shows a configuration example of an electronic device.

FIG. 27 shows a configuration example of an electronic device 300 that includes the circuit device 10 of this embodiment. This electronic device 300 includes the circuit device 10 of this embodiment and the main controller 200 that is a processing device. The main controller 200 is connected to the first bus BS1. For example, the main controller 200 and the circuit device 10 are connected via the first bus BS1. Also, the peripheral device 260, for example, is connected to the second bus BS2 of the circuit device 10.

The main controller 200 is realized by a processor such as a CPU or an MPU. Alternatively, the main controller 200 may be realized by any of various ASIC circuit devices. Moreover, the main controller 200 may be realized by a circuit board on which multiple circuit devices (ICs) and circuit components are mounted. The portable terminal device 250 shown in FIG. 1 or the like can be envisioned as the peripheral device 260, but there is no limitation to this. The peripheral device 260 may be a wearable device or the like.

The electronic device 300 can further include a storage 310, an operator 320, and a display 330. The storage 310 is for storing data, and the functionality thereof can be realized by an HDD (hard disk drive), a semiconductor memory such as a RAM or a ROM, or the like. The operator 320 enables a user to perform input operations, and can be realized by operation devices such as operation buttons or a touch panel display. The displayer 330 is for displaying various types of information, and can be realized by a display such as a liquid crystal display or an organic EL display. Note that in the case of using a touch panel display as the operator 320, this touch panel display can realize the functionality of both the operator 320 and the display 330.

Various types of devices can be envisioned as the electronic device 300 realized by this embodiment, examples of which include a vehicle-mounted device, a printing device, a projecting device, a robot, a head-mounted display device, a biological information measurement device, a measurement device for measuring a physical quantity such as distance, time, flow speed, or flow rate, a network-related device such as a base station or a router, a content provision device that distributes content, and a video device such as a digital camera or a video camera.

Figure 28:
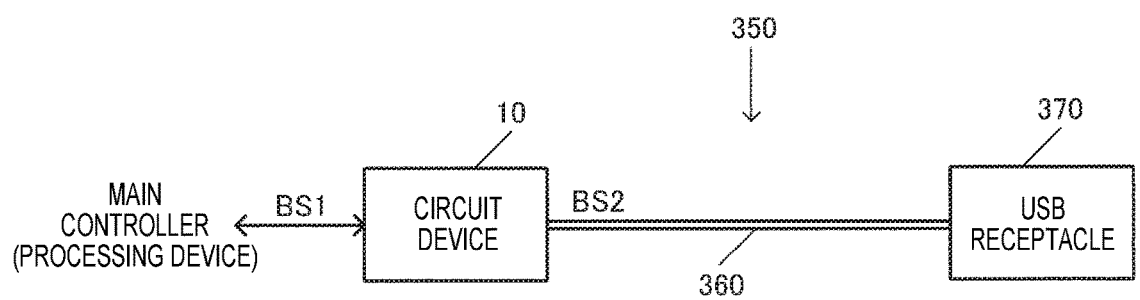
FIG. 28 shows a configuration example of a cable harness.

FIG. 28 shows a configuration example of a cable harness 350 that includes the circuit device 10 of this embodiment. The cable harness 350 includes the circuit device 10 of this embodiment and a cable 360. The cable 360 is a USB cable. The cable harness 350 may include a USB receptacle 370. Alternatively, the cable harness 350 may include the electrostatic protection circuit 222 and the short-circuit protection circuit 223 in FIG. 1, for example. The cable 360 is connected to the second bus BS2 of the circuit device 10, for example. The main controller 200 that is a processing device or the like is connected to the first bus BS1 side of the circuit device 10. This cable harness 350 is used in an application such as the routing of a wire in a vehicle, for example. Note that the cable harness 350 may be a harness for an application other than a vehicle.

Note that although an embodiment has been explained in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the range of the invention. Moreover, the configuration and operation of the circuit device, the electronic device, and the cable harness, as well as the bus monitor processing, the bus switch processing, the transfer processing, the disconnection detection processing, the upstream port detection processing, and the like are not limited to those described in the embodiment, and various modifications are possible.

What is claimed is:

1. A circuit device comprising:
   a first physical layer circuit to which a first bus that complies with a USB standard is connected;
   a second physical layer circuit to which a second bus that complies with the USB standard is connected;
   a bus switch circuit, one end of which is connected to the first bus, another end of which is connected to the second bus, and that switches connection between the first bus and the second bus on in a first period and off in a second period; and
   a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit,
   wherein the bus switch circuit includes:
   a first switch circuit, one end of which is connected to the first bus, and that is switched on in the first period, and is switched off in the second period,
   a second switch circuit, one end of which is connected to the second bus, and that is switched on in the first period, and is switched off in the second period, and
   a signal line that is connected to another end of the first switch circuit and another end of the second switch circuit, and
   wherein, when a line at a center between a first side and a second side of the circuit device that oppose each other is assumed to be a central line, a region between the central line and the first side is assumed to be a first region, and a region between the central line and the second side is assumed to be a second region,
   a first high speed (HS) driver of the first physical layer circuit and the first stitch circuit are arranged in the first region, and
   a second HS driver of the second physical layer circuit and the second switch circuit are arranged in the second region.

2. The circuit device according to claim 1,
   wherein, when a direction from the first side toward the second side is assumed to be a first direction, and one of directions orthogonal to the first direction is assumed to be a second direction,
   the first switch circuit is arranged on the second direction side of the first HS driver, and
   the second switch circuit is arranged on the second direction side of the second HS driver.

3. The circuit device according to claim 1, further comprising:
   a first terminal to which a Data Plus (DP) signal line of the first bus is connected;
   a second terminal to which a Data Minus (DM) signal line of the first bus is connected;
   a third terminal to which a DP signal line of the second bus is connected; and
   a fourth terminal to which a DM signal line of the second bus is connected,
   wherein, when a direction from the first side toward the second side is assumed to be a first direction, and a direction opposite to the first direction is assumed to be a third direction,
   the first switch circuit is arranged on the first direction side of the first terminal and the second terminal, and
   the second switch circuit is arranged on the third direction side of the third terminal and the fourth terminal.

4. The circuit device according to claim 1, further comprising:
   a first terminal to which a Data Plus (DP) signal line of the first bus is connected;
   a second terminal to which a Data Minus (DM) signal line of the first bus is connected;
   a third terminal to which a DP signal line of the second bus is connected; and
   a fourth terminal to which a DM signal line of the second bus is connected,
   wherein the first switch circuit is arranged in a first I/O region in which the first terminal and the second terminal are arranged, and
   the second switch circuit is arranged in a second I/O region in which the third terminal and the fourth terminal are arranged.

5. The circuit device according to claim 4,
   wherein a first I/O cell that has the first terminal and a second I/O cell that has the second terminal are arranged in the first I/O region,
   a third I/O cell that has the third terminal and a fourth I/O cell that has the fourth terminal are arranged in the second I/O region,
   the first switch circuit is arranged between the first I/O cell and the second I/O cell, and
   the second switch circuit is arranged between the third I/O cell and the fourth I/O cell.

6. The circuit device according to claim 1,
   wherein a wiring width of the signal line that connects the first switch circuit and the second switch circuit is larger than a wiring width of a signal line that connects the first bus and the first switch circuit and a wiring width of a signal line that connects the second bus and the second switch circuit.

7. The circuit device according to claim 1,
   wherein a cross-section area in a transverse cross section of the signal line that connects the first switch circuit and the second switch circuit is larger than a cross-section area in a transverse cross section of the signal line that connects the first bus and the first switch circuit and a cross-section area in a transverse cross section of the signal line that connects the second bus and the second switch circuit.

8. The circuit device according to claim 1,
   wherein the signal line that connects the first switch circuit and the second switch circuit includes a first metal wiring layer and a second metal wiring layer.

9. The circuit device according to claim 1, further comprising:
   a bus monitor circuit that performs a monitor operation of the first bus and the second bus,
   wherein the bus switch circuit switches the connection between the first bus and the second bus on or off based on a monitoring result of the bus monitor circuit.

10. An electronic device comprising:
    the circuit device according to claim 1; and
    a processing device that is connected to the first bus.

11. A cable harness comprising:
the circuit device according to claim 1; and
a cable.

12. A circuit device comprising:
a first physical layer circuit having a first end and a second end, the first end being configured to be connected to a first bus that complies with a USB standard;
a second physical layer circuit having a third end and a fourth end, the fourth end being configured to be connected to a second bus that complies with the USB standard;
a bus switch circuit that switches connection between the first bus and the second bus on in a first period and off in a second period, the bus switch circuit having a fifth end and a sixth end, the fifth end being configured to be connected to the first bus and the sixth end being configured to be connected to the second bus;
a processing circuit that is connected between the second end and the third end and performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit;
first side and a second side that oppose each other;
a central portion between the first side and second side;
first region between the central portion and the first side; and
a second region between the central portion and the second side,
wherein the bus switch circuit includes:
a first switch circuit that is switched on in the first period, and is switched off in the second period, the first switch having a seventh end and an eighth end, the seventh end being configured to be connected to the first bus, and,
a second switch circuit that is switched on in the first period, and is switched off in the second period, the second switch having a ninth end and a tenth end, the tenth end being configured to be connected to the second bus, and
a signal line that is connected between the eighth end and the ninth end, and
wherein the first physical layer circuit includes a first high speed (HS) driver and the second physical layer circuit includes a second HS driver,
the first HS driver and the first switch circuit are arranged in the first region, and
the second HS driver and the second switch circuit are arranged in the second region.

13. The circuit device according to claim 12, wherein
the first side and the second side define a first direction that extends from the first side toward the second side,
the first switch circuit is arranged further along a second direction than the first HS driver, the second direction being orthogonal to the first direction, and
the second switch circuit is arranged further along the second direction than the second HS driver.

14. The circuit device according to claim 12, further comprising:
a first terminal configured to be connected to a Data Plus (DP) signal line of the first bus;
a second terminal configured to be connected to a Data Minus (DM) signal line of the first bus;
a third terminal configured to be connected to a DP signal line of the second bus; and
a fourth terminal configured to be connected to a DM signal line of the second bus,
wherein:
the first side and the second side defining a first direction that extends from the first side toward the second side,
the first switch circuit is arranged further along the first direction than the first terminal and the second terminal, and
the second switch circuit is arranged backwards from the third terminal and the fourth terminal in the first direction.

* * * * *